(12) United States Patent
Egger et al.

(10) Patent No.: US 12,038,120 B2
(45) Date of Patent: Jul. 16, 2024

(54) PIPE END PROTECTOR

(71) Applicant: TENARIS CONNECTIONS B.V., Amsterdam (NL)

(72) Inventors: Pablo Egger, Campana (AR); Raul Ernesto Ageno, Campana (AR); Gastón Mazzaferro, Campana (AR); Lucas Giraldo, Campana (AR); Jose Carella, Mar del Plata (AR); Carlos Piacentini, Mar del Plata (AR); Claudio Javier Perez, Mar del Plata (AR)

(73) Assignee: TENARIS CONNECTIONS B.V., Amsterdam (NL)

( * ) Notice: Subject to any disclaimer, the term of this patent is extended or adjusted under 35 U.S.C. 154(b) by 422 days.

(21) Appl. No.: 17/058,483

(22) PCT Filed: May 29, 2019

(86) PCT No.: PCT/NL2019/050311
§ 371 (c)(1),
(2) Date: Nov. 24, 2020

(87) PCT Pub. No.: WO2019/231322
PCT Pub. Date: Dec. 5, 2019

(65) Prior Publication Data
US 2021/0199232 A1 Jul. 1, 2021

(30) Foreign Application Priority Data
May 29, 2018 (NL) ........................... 2021001

(51) Int. Cl.
*F16L 57/00* (2006.01)
*B29C 45/16* (2006.01)
(Continued)

(52) U.S. Cl.
CPC ........ *F16L 57/005* (2013.01); *B29C 45/1676* (2013.01); *B29C 45/2618* (2013.01);
(Continued)

(58) Field of Classification Search
CPC ... F16L 57/005; F16L 58/128; F16L 55/1152; F16L 15/04
(Continued)

(56) References Cited

U.S. PATENT DOCUMENTS 4,796,668 A * 1/1989 Depret .................. B65D 59/00
138/96 T
7,284,770 B2 10/2007 Dell'Erba et al.
(Continued)

FOREIGN PATENT DOCUMENTS

FR 3030670 6/2016

OTHER PUBLICATIONS

PCT International Search Report and Written Opinion in International Appln. No. PCT/NL2019/050311, dated Sep. 23, 2019, 11 pages.

*Primary Examiner* — Patrick F Brinson
(74) *Attorney, Agent, or Firm* — Morgan, Lewis & Bockius LLP

(57) ABSTRACT

A pipe end protector for protecting pipe threads provided on a pipe end of a pipe component for exploration and production of a hydrocarbon well, said pipe end protector comprising a main body and an annular flexible lip seal, wherein the main body is made from a first polymeric material having a first elastic modulus, and the lip seal is made from a second polymeric material having a second elastic modulus which is lower than the first elastic modulus.

15 Claims, 26 Drawing Sheets

Figure 1B:
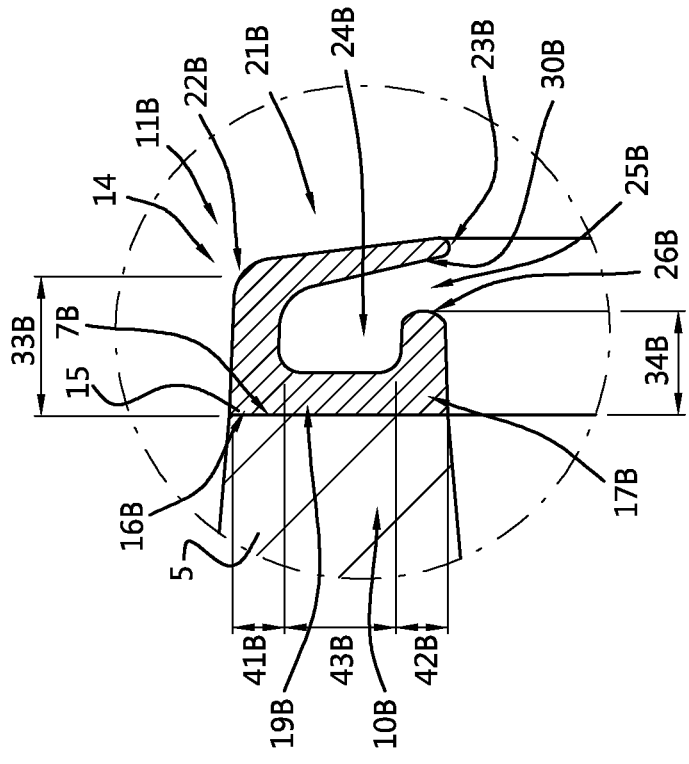

(51) Int. Cl.
   *B29C 45/26* (2006.01)
   *E21B 17/042* (2006.01)
   *F16L 15/04* (2006.01)
   B29K 23/00 (2006.01)
   B29K 105/00 (2006.01)
   B29L 1/00 (2006.01)

(52) U.S. Cl.
   CPC ............ *E21B 17/042* (2013.01); *F16L 15/04* (2013.01); *B29K 2023/06* (2013.01); *B29K 2023/08* (2013.01); *B29K 2105/0085* (2013.01); *B29L 2001/00* (2013.01)

(58) Field of Classification Search
   USPC ...................................... 138/96 T, 96 R, 109
   See application file for complete search history.

(56) References Cited

U.S. PATENT DOCUMENTS

| | | | |
|---|---|---|---|
| 7,469,721 B2* | 12/2008 | Takano | E21B 17/006 |
| | | | 138/96 T |
| 9,206,930 B2 | 12/2015 | Courtois et al. | |
| 2005/0045240 A1* | 3/2005 | Casteran | F16L 57/005 |
| | | | 138/96 T |
| 2015/0308605 A1* | 10/2015 | Aguilar | E21B 17/042 |
| | | | 138/96 T |
| 2017/0245156 A1 | 9/2017 | Mendez et al. | |
| 2017/0370160 A1 | 12/2017 | Mendez et al. | |
| 2018/0274711 A1* | 9/2018 | Aguilar Mendez | E21B 17/006 |

* cited by examiner

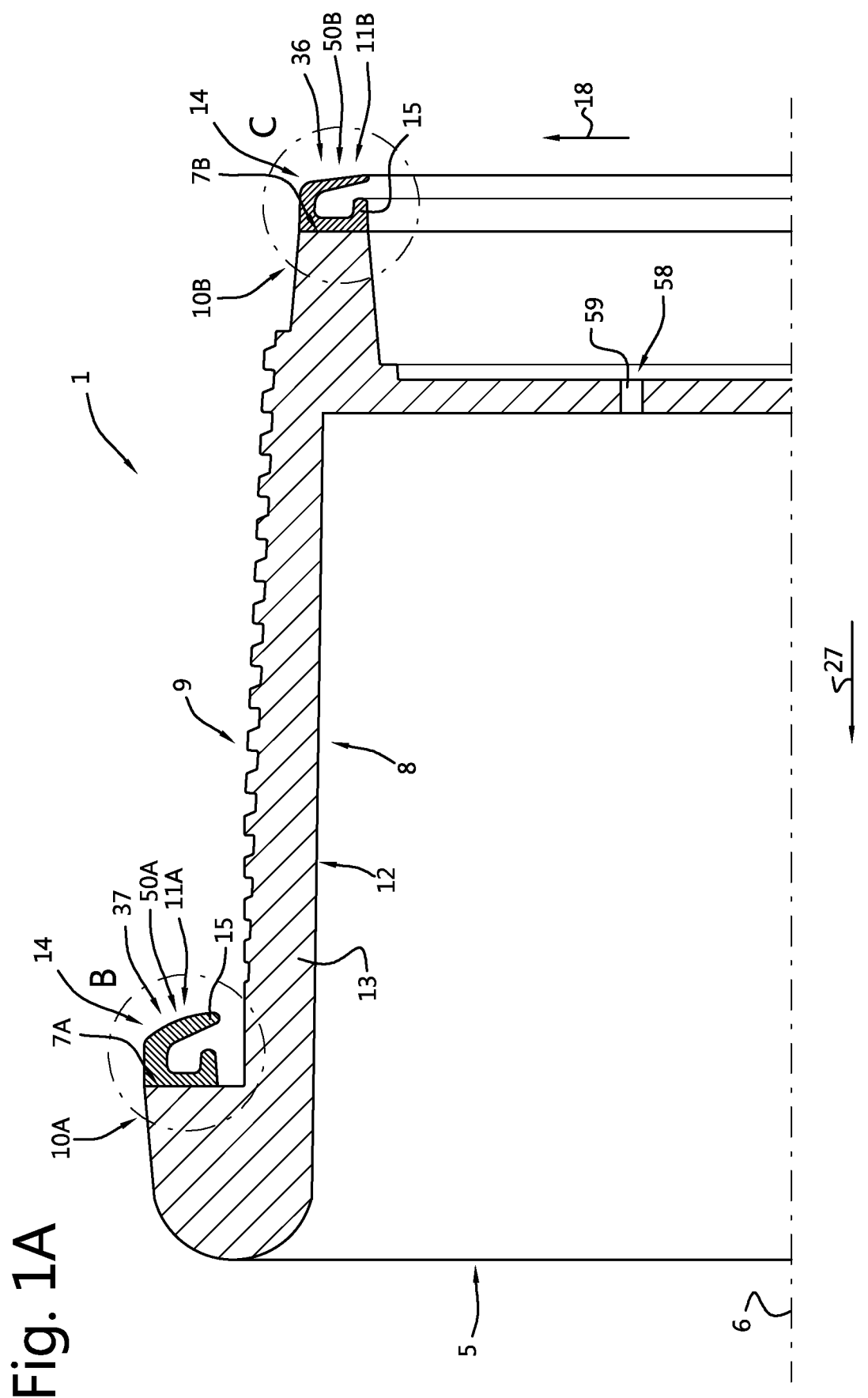

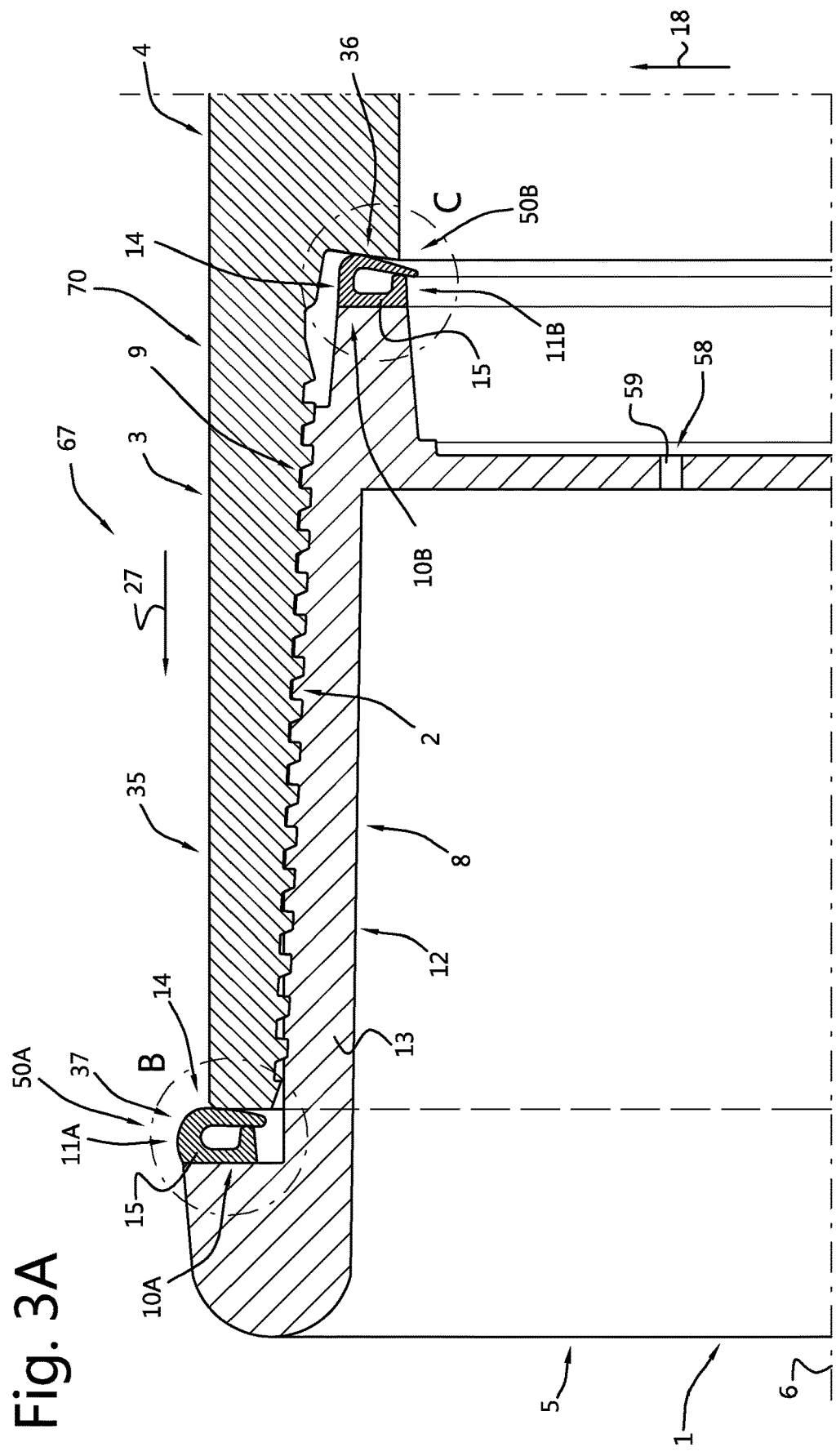

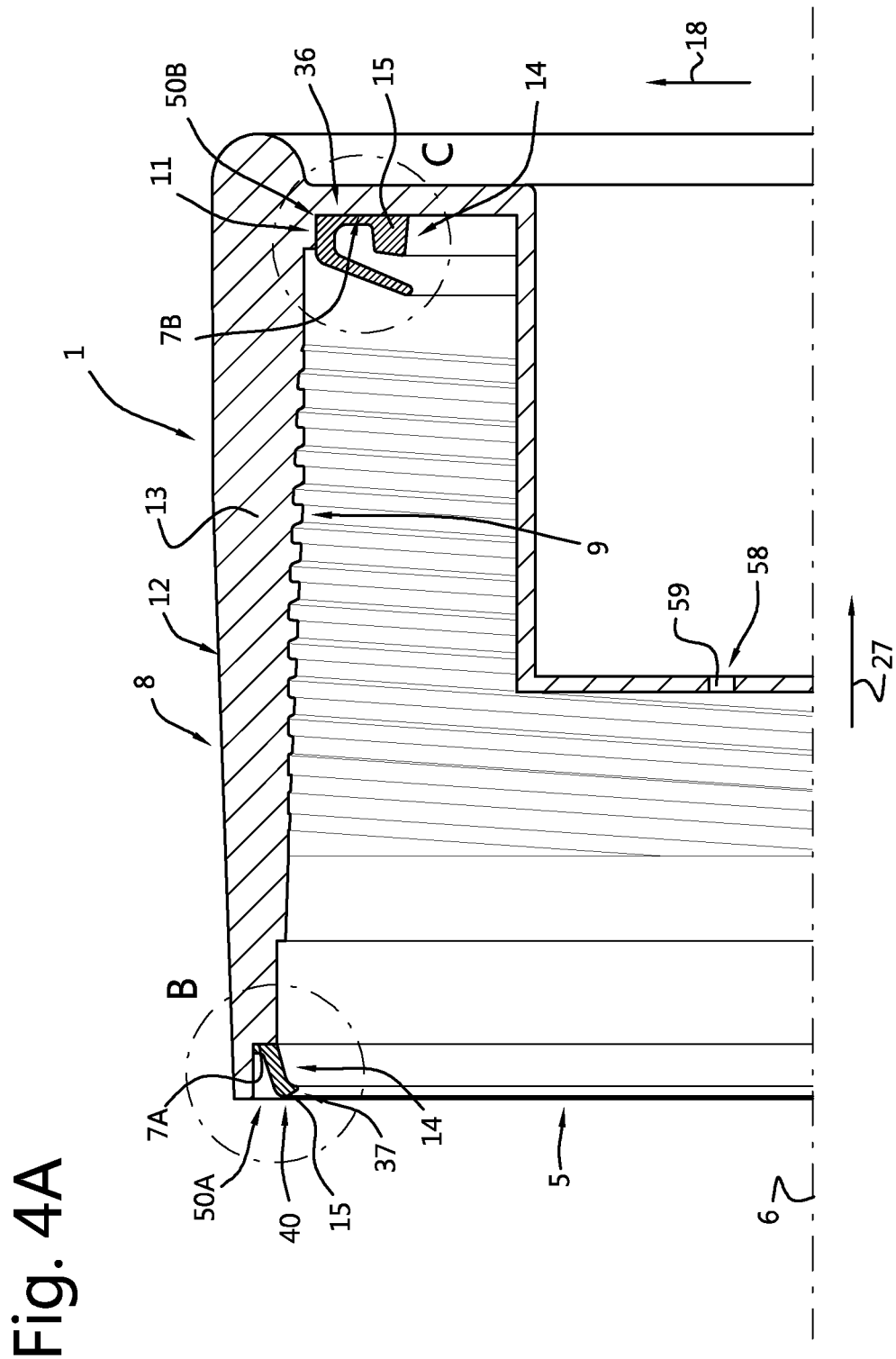

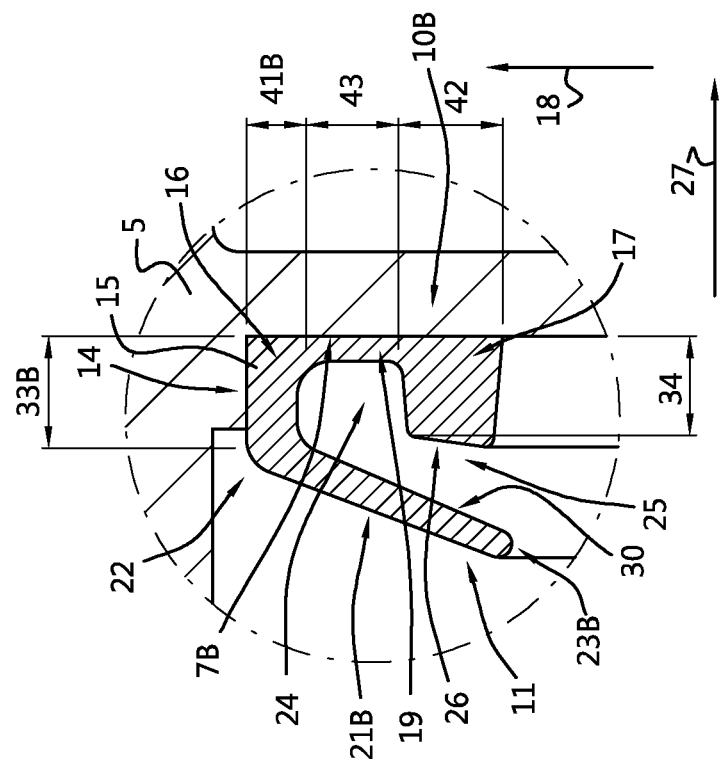
Fig. 4C-I
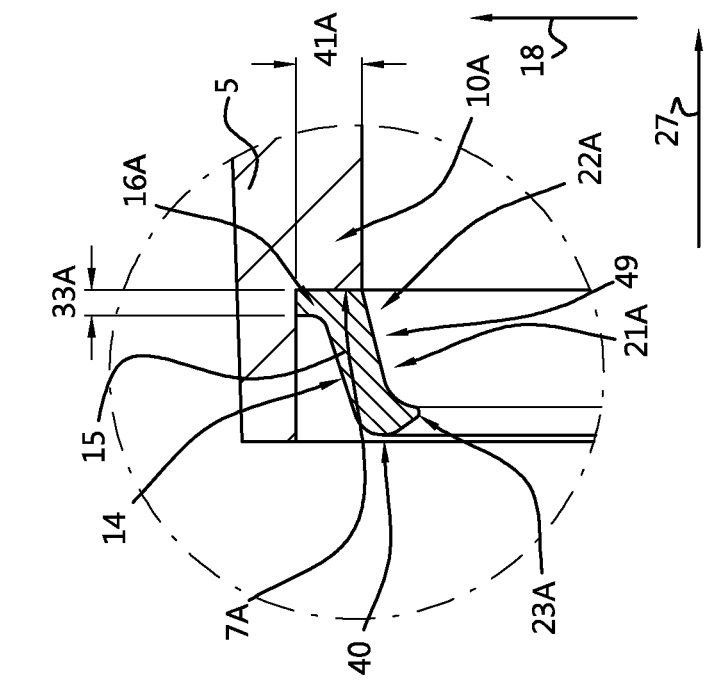
Fig. 4B-I

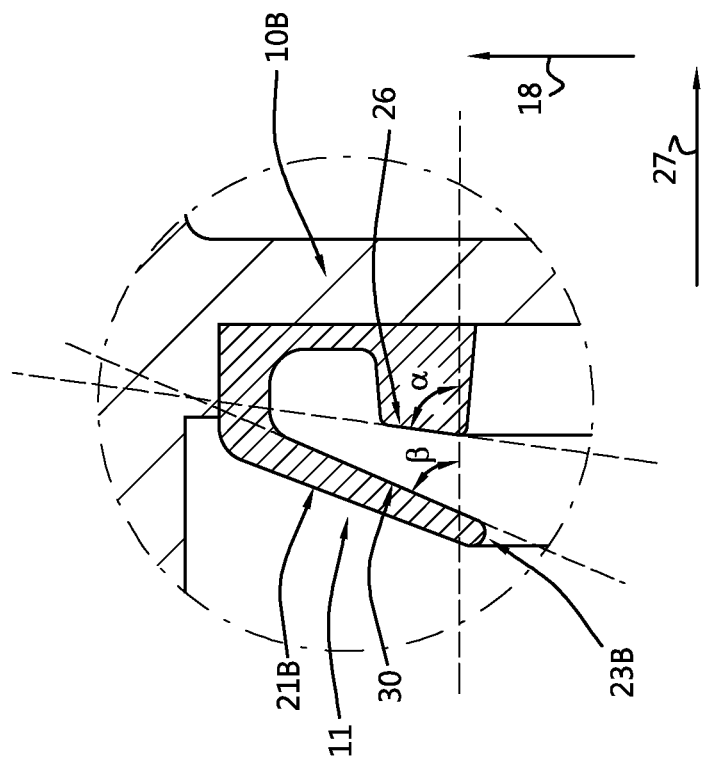
Fig. 4C-II
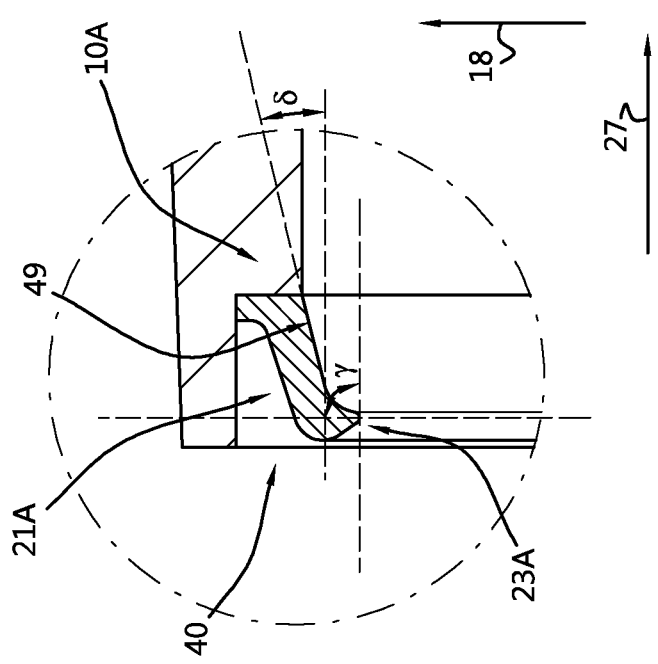
Fig. 4B-II

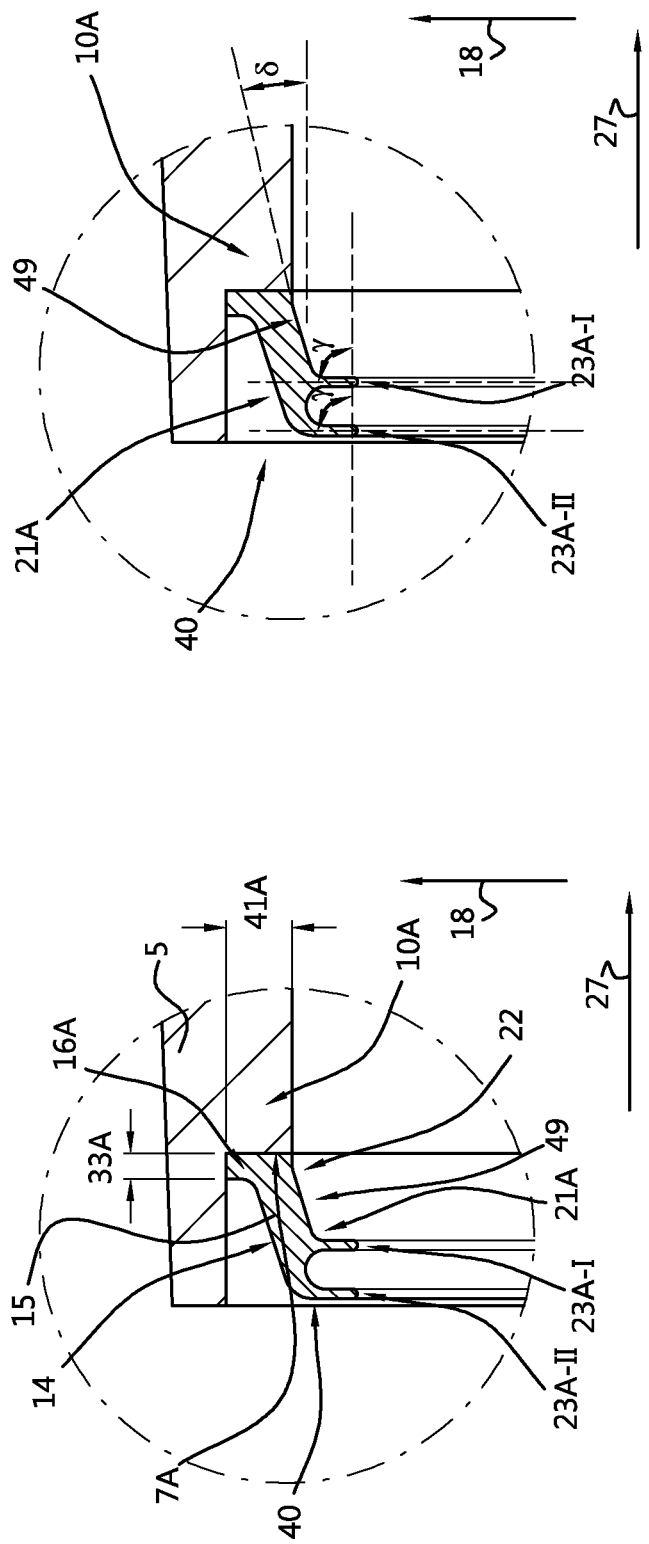

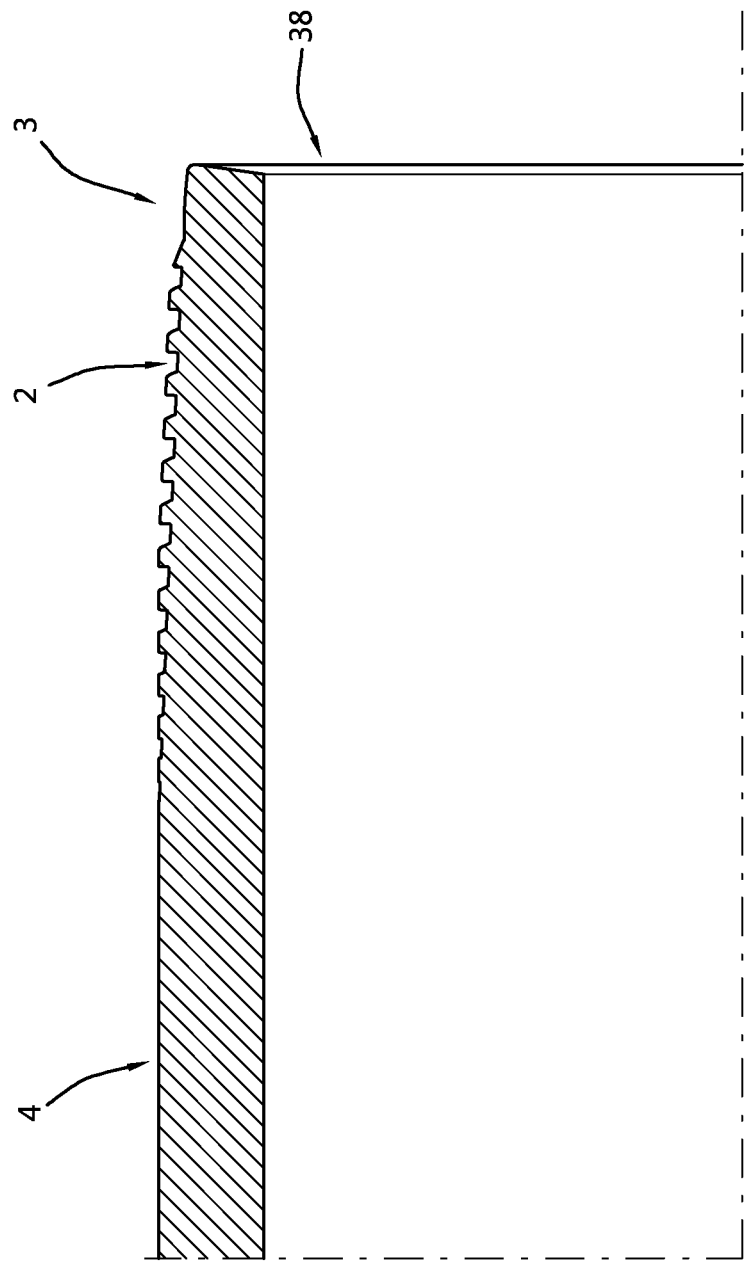

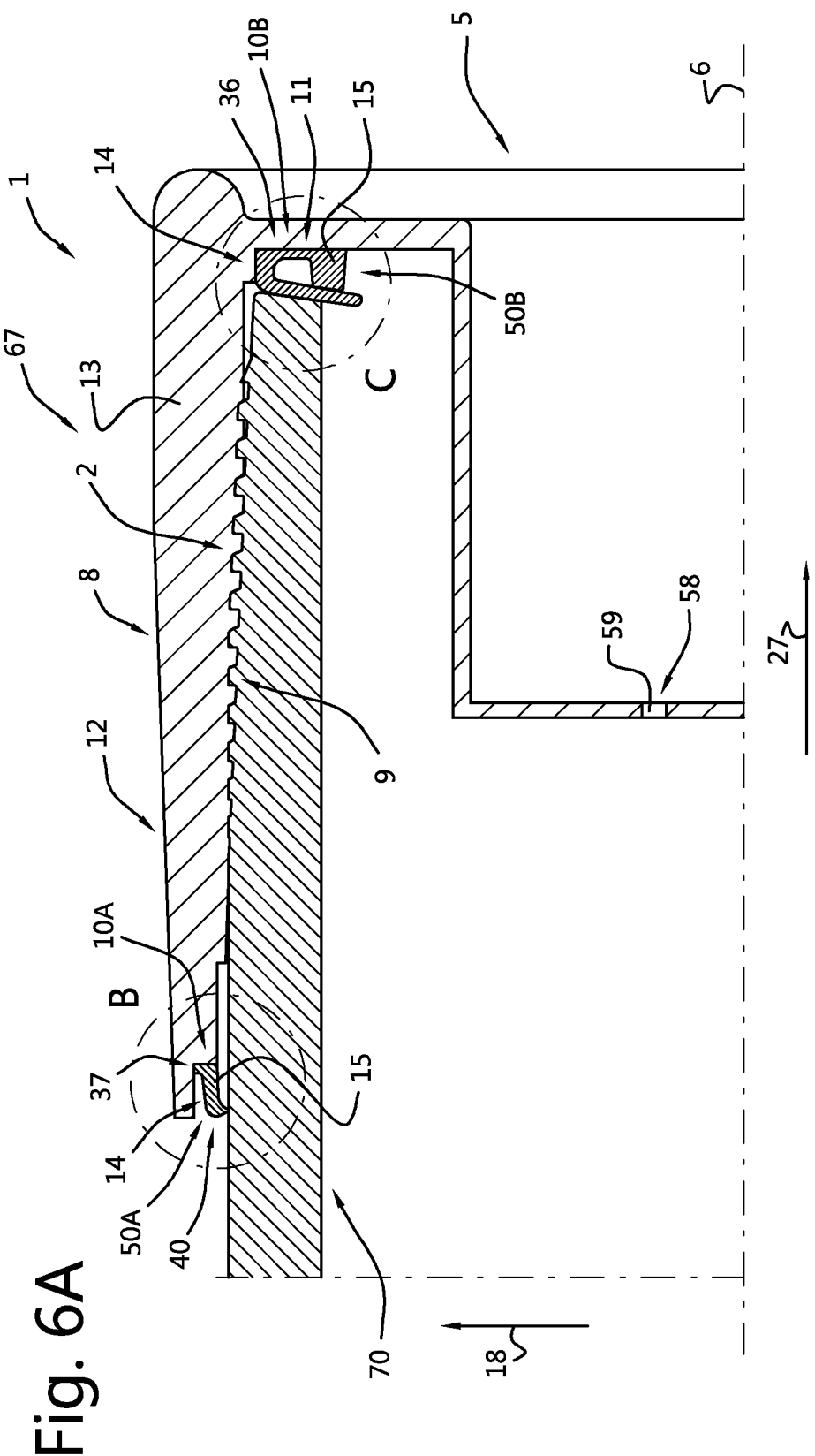

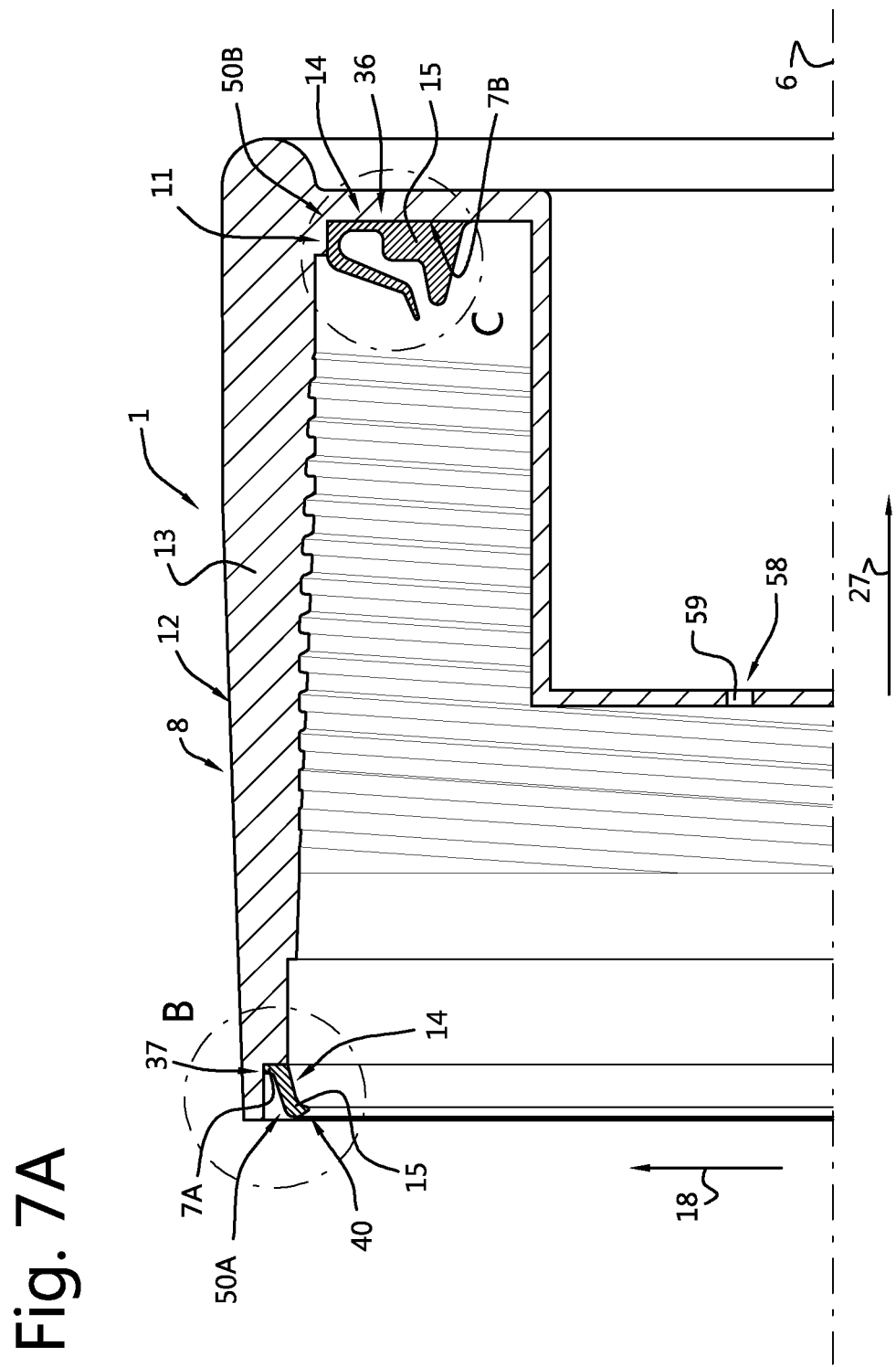

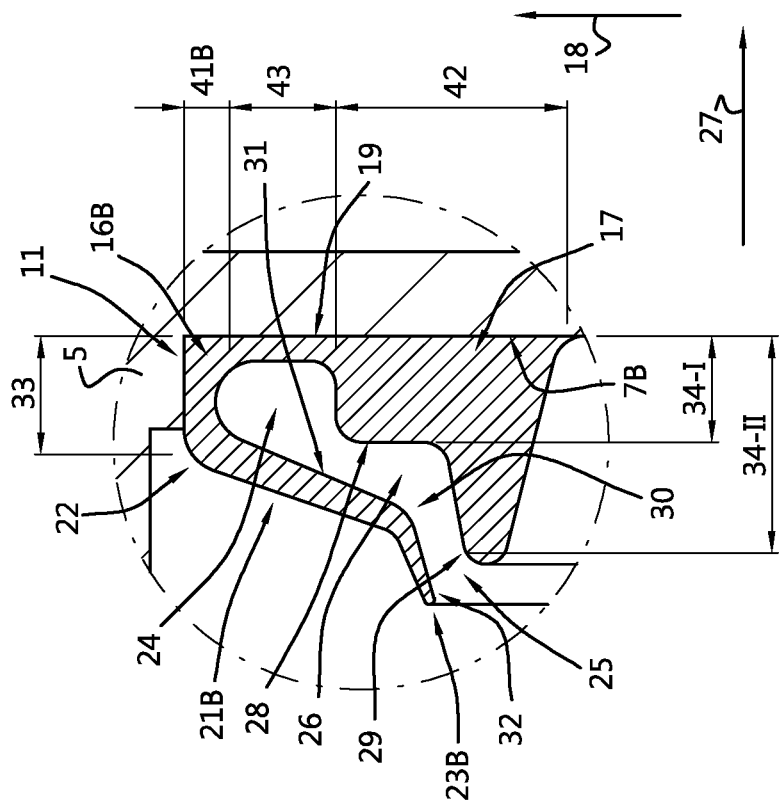
Fig. 7C-I
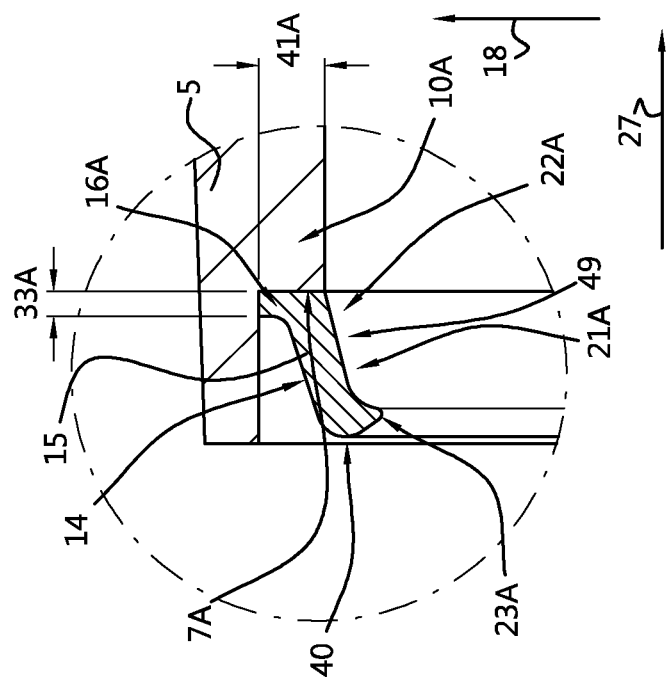
Fig. 7B

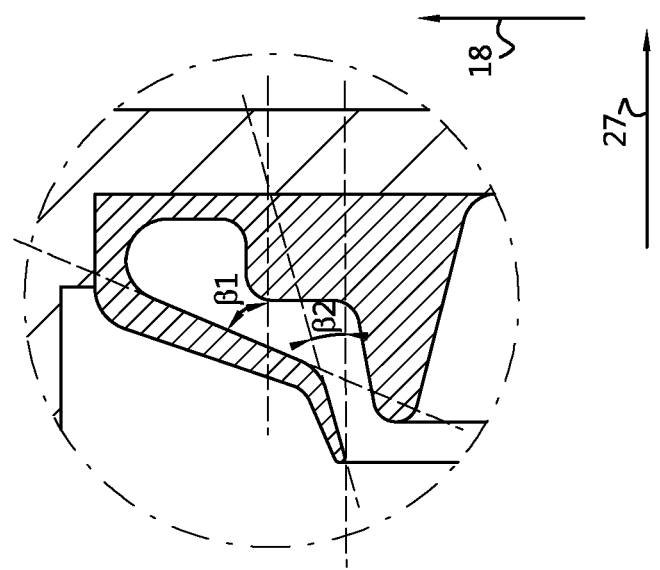
Fig. 7C-III
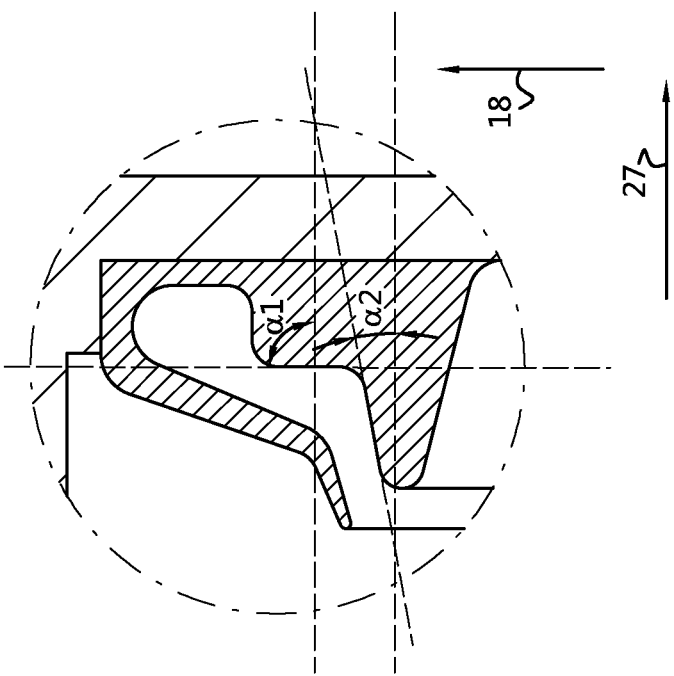
Fig. 7C-II

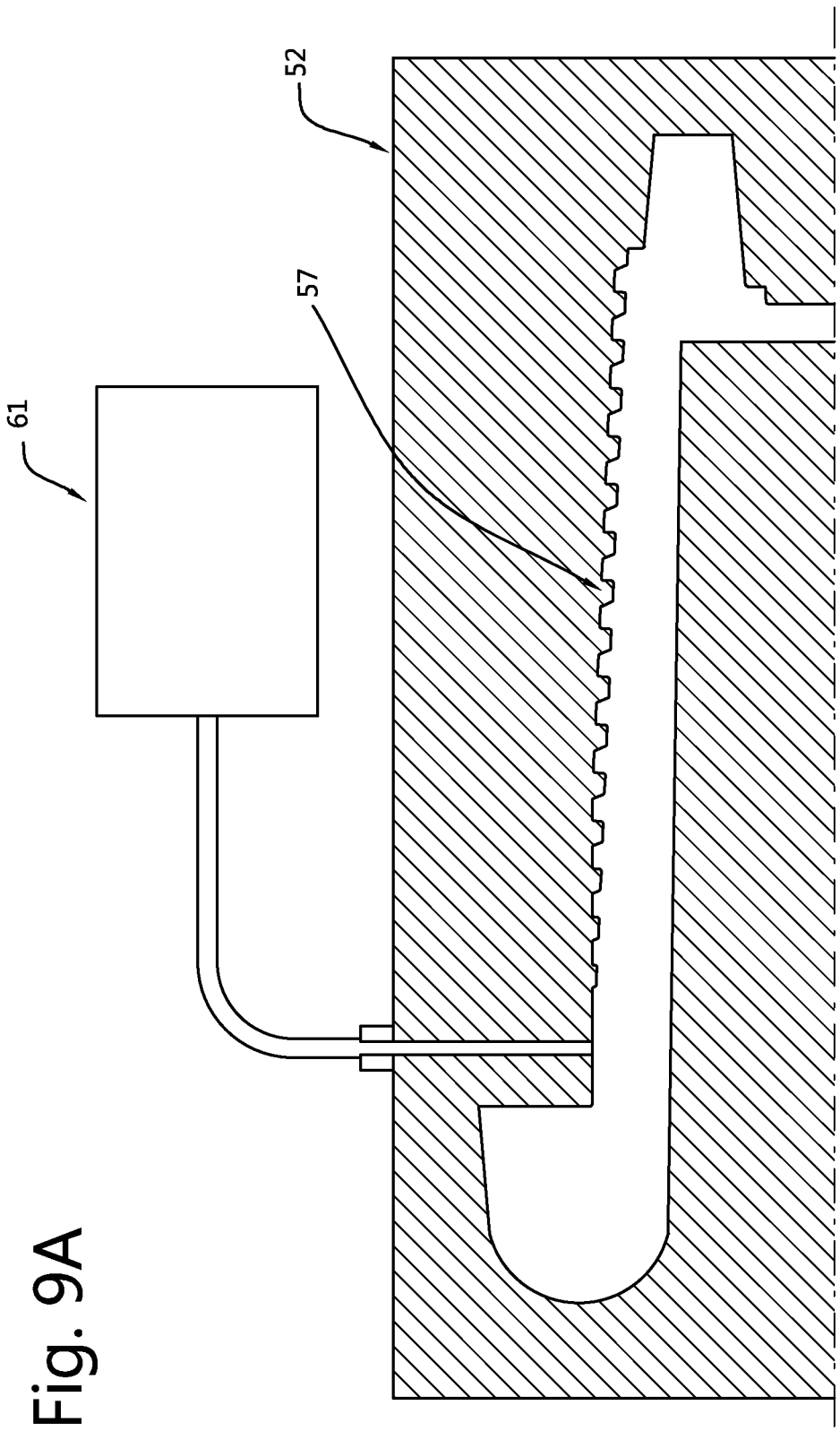

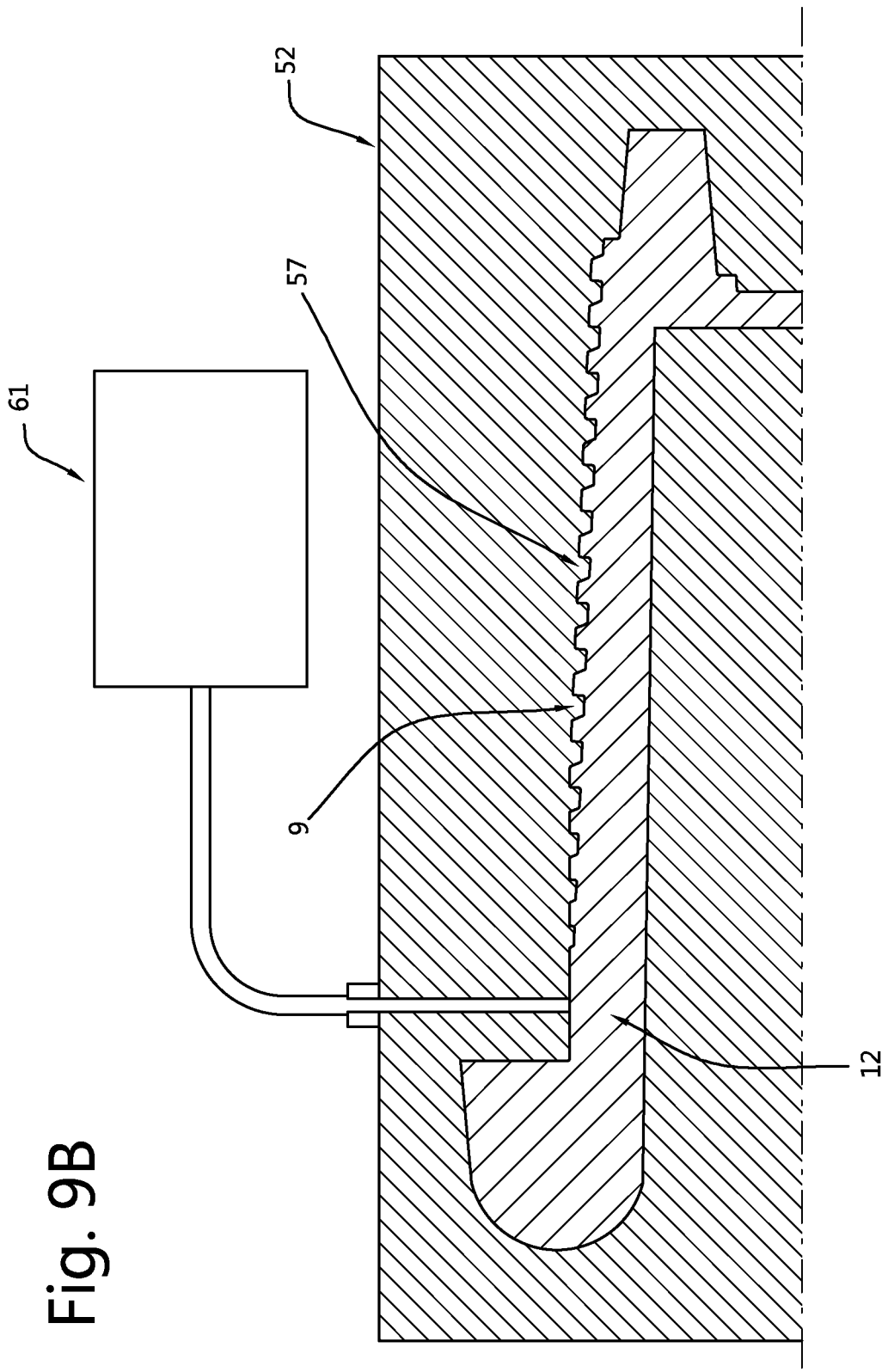

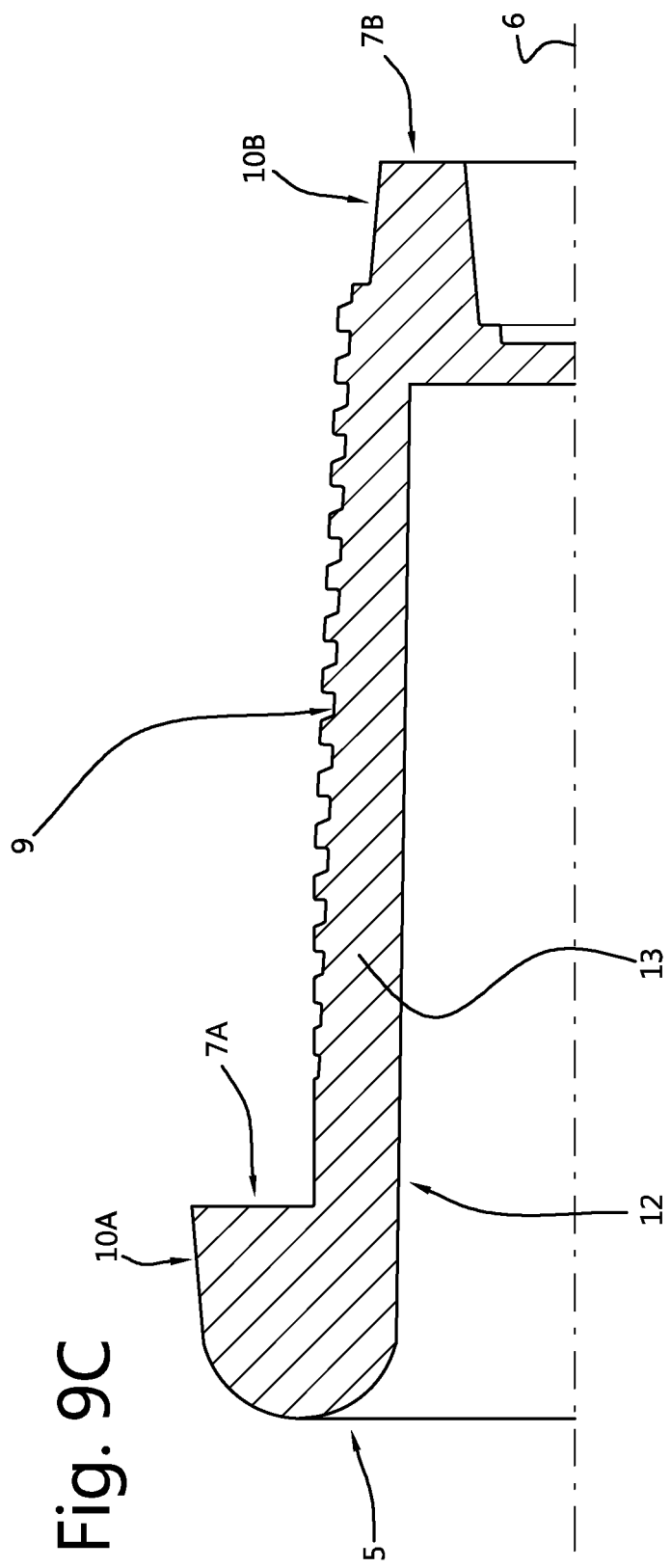

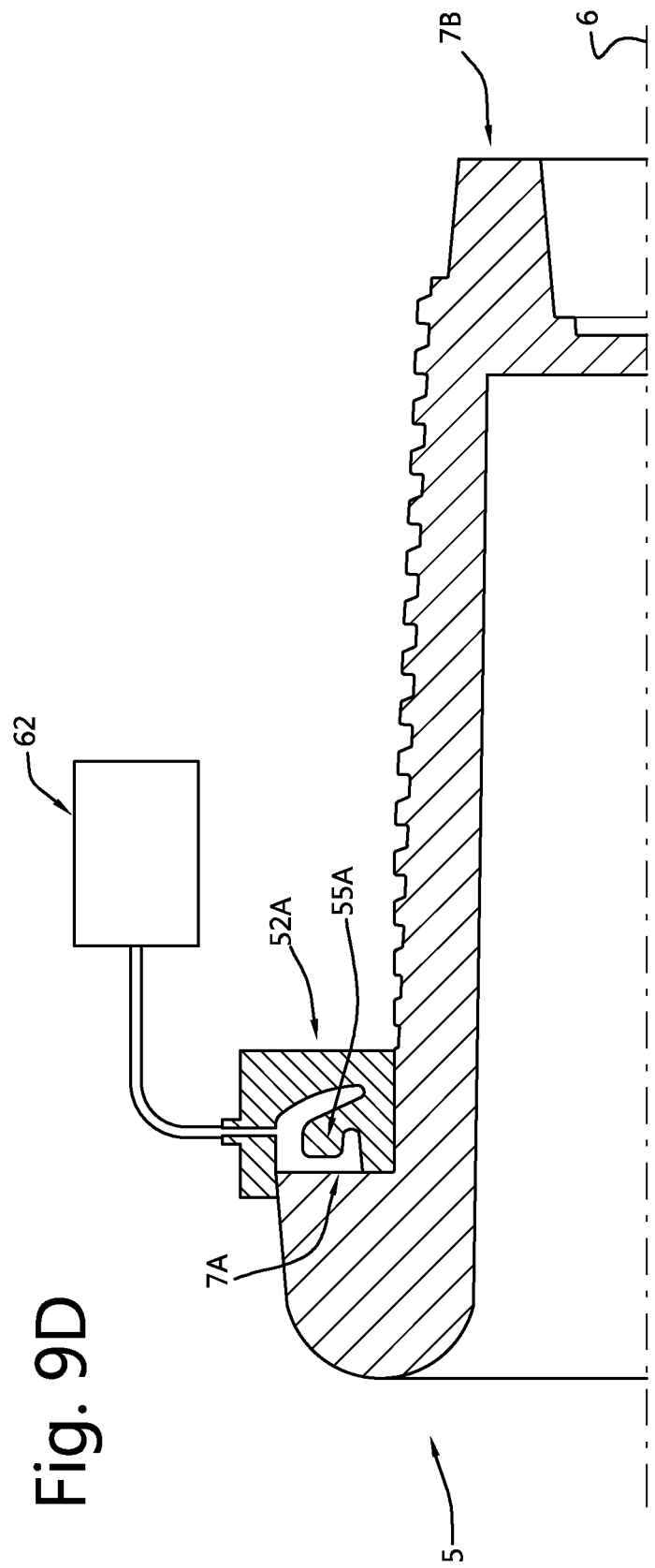

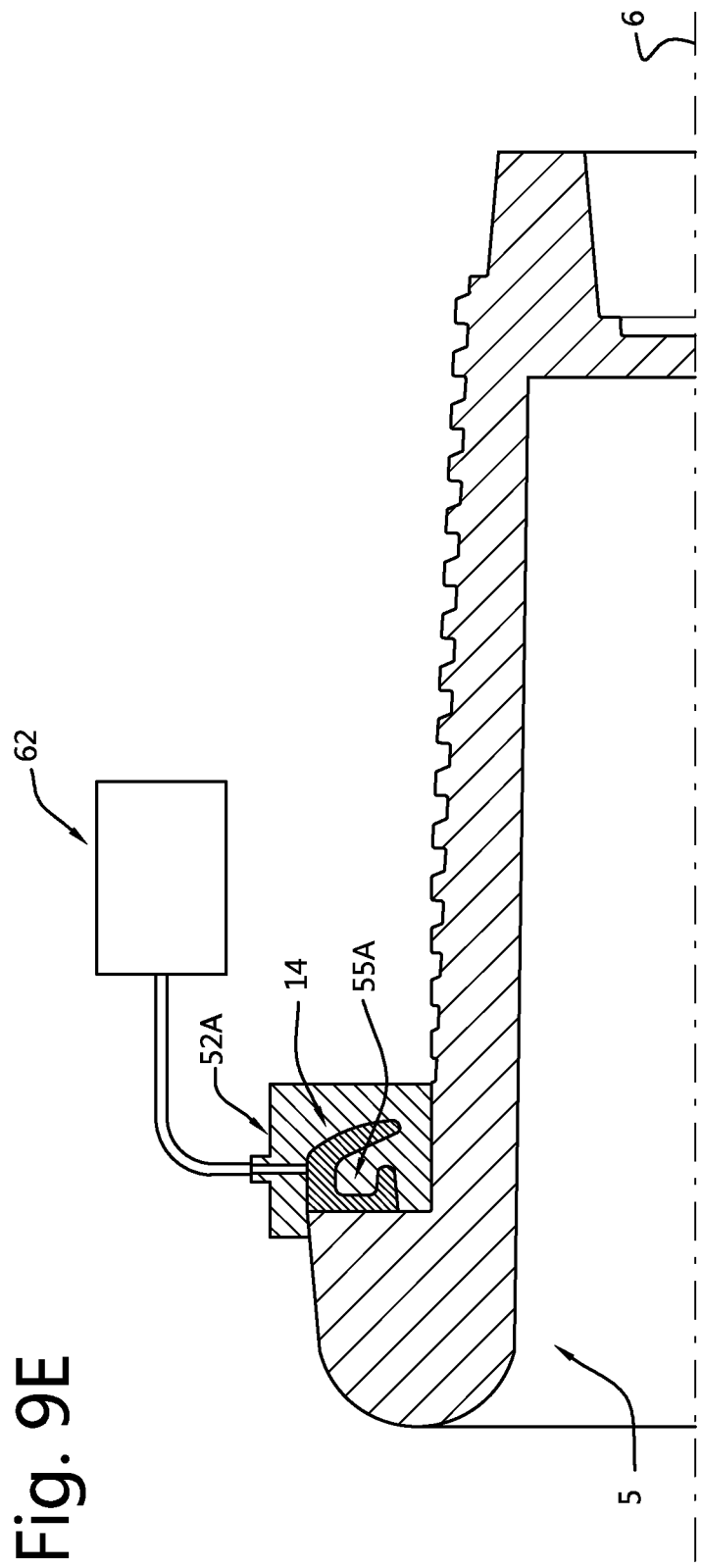

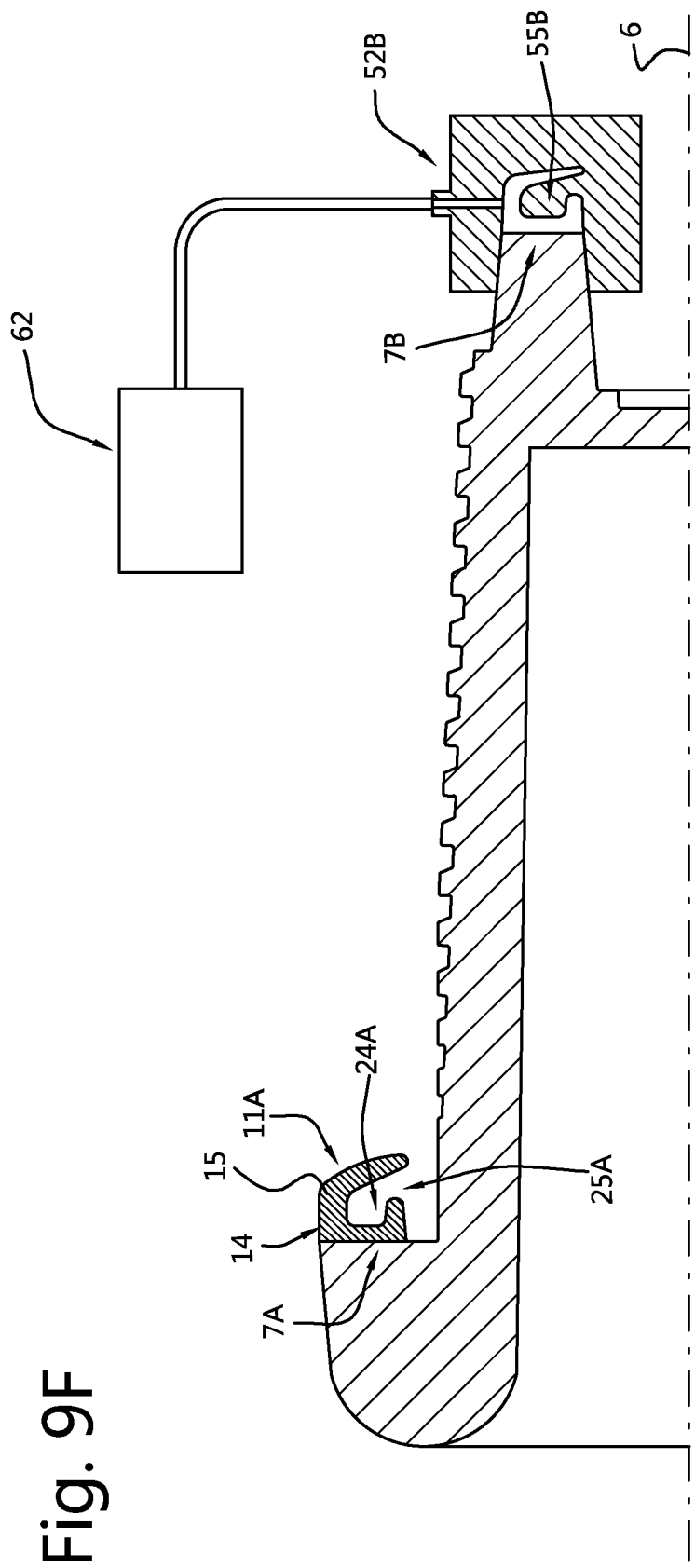

PIPE END PROTECTOR

CROSS-REFERENCE TO RELATED APPLICATION(S)

This application is a U.S. National Phase Application under 35 U.S.C. § 371 and claims the benefit of priority to International Application Serial No. PCT/NL2019/050311, filed May 29, 2019, which claims priority to The Netherlands Application Serial No. NL2021001, filed May 29, 2018, the contents of which are hereby incorporated by reference.

FIELD OF THE INVENTION

The invention relates to a pipe end protector for protecting pipe threads provided on a pipe end of a pipe component for exploration and production of a hydrocarbon well, and to an assembly comprising such a pipe end protector and pipe component. The invention also relates to a method for producing such pipe end protector.

After a pipe component for exploration and production of a hydrocarbon well has been produced, it must be shipped to the location when the exploration and production of the hydrocarbon well takes place. During this transport, there is a high risk that the pipe threads of the pipe end will get damaged. In order to reduce this risk, a pipe end protector is screwed onto the pipe end to cover the pipe threads. To avoid that moisture or small solid particles, e.g. dust, accumulates at the pipe threads, the pipe end protector is provided with at least one seal. In general, the pipe end protector has an internal seal and an external seal and the pipe threads are located between the internal seal and the external seal.

BACKGROUND OF THE INVENTION

U.S. Pat. No. 7,284,770 discloses a pipe end protector for protecting pipe threads provided on a pipe end of a pipe component for exploration and production of a hydrocarbon well. The pipe end protector comprises a main body having a longitudinal axis and a tubular portion provided with protector threads configured to cooperate with the pipe threads of the pipe end. Grooves are provided in main body and an internal seal and an external seal are manually placed in said grooves. In the pipe end protector of FIG. 5, the internal seal is an axial seal and the external seal is a radial seal. In the pipe end protector of FIG. 6, the internal seal and the external seal are axial seals.

This pipe end protector has the disadvantage that the production costs are relatively high.

This is amongst others caused by the fact that the seals are manually placed in the grooves.

The pipe end protector may have a further disadvantage that its sealing capacity is in practice not always sufficient to protect the pipe threads.

The sealing capacity of the seal may in practice not always be sufficient to protect the pipe threads. This situation may arise when the pipe threads and the protector threads are screwed too far or not far enough in each other due to which the pipe end is not located in its final make-up position.

The seal may move out of its grooves when the pipe end protector is re-used. As result of this, the average sealing capacity of the pipe end protector reduces relatively fast when it is re-used. The pipe end protector can therefore in general only be re-used for a relatively limited number of times.

SUMMARY OF THE INVENTION

The invention has the objective to provide an improved, or at least alternative, pipe end protector for protecting pipe threads provided on a pipe end of a pipe component for exploration and production of a hydrocarbon well. The pipe end protector comprises;
  a main body having a longitudinal axis, at least one support portion having an at least partly radially extending annular seal support surface, and a tubular portion provided with protector threads configured to cooperate with the pipe threads of the pipe end, and
  an annular flexible lip seal provided on the seal support surface, wherein;
    the main body is made from a first polymeric material having a first elastic modulus,
    the lip seal is made from a second polymeric material having a second elastic modulus which is lower than the first elastic modulus, and
    the lip seal comprises an annular lip base portion which extends radially along at least part of the seal support surface and is attached to the seal support surface by over moulding.

Over moulding the lip seal on the main body allows that the pipe end protector can be produced in an efficient manner with less manual labour. In addition, since the lip seal only or mainly has slender parts (when seen in a cross sectional view along the longitudinal axis), it is very suitable to be produced by over moulding in an efficient manner.

In an embodiment of the pipe end protector, the first polymeric material and the second polymeric material are selected to adhesively attach to each other by over moulding. This allows that the protectors can be re-used more often because the lip seal remains in its position on the main body by due to its adhesively attachment to the seal support surface of the main body.

In an embodiment of the pipe end protector, the adhesive attachment is caused by chemical, dispersive and/or diffusive adhesion of the first polymeric material and the second polymeric material created by over moulding.

In an embodiment of the pipe end protector, the first polymeric material of the main body is a polyolefin, preferable polyethylene.

In an embodiment of the pipe end protector, the second polymeric material of the lip seal is an elastomer, preferably an olefin block copolymer, more preferably a block copolymer of blocks of polyethylene alternating with blocks of ethylene/octene copolymer.

In an embodiment of the pipe end protector, the lip seal comprises an annular lip which extends from a foot of the lip being attached to the lip base portion to a free rim of the lip being axially spaced from the lip base portion, and wherein the foot and the free rim are radially offset.

In an embodiment of the pipe end protector, the lip seal is an axial lip seal, the axial lip seal comprises an annular support base portion which extends radially along at least part of the seal support surface and is attached to the seal support surface by over moulding, the support base portion comprises an annular base contact surface configured to, in use, contact an annular lip contact surface of the lip, the lip base portion and the support base portion are radially spaced from each other, and the lip and the support base portion are axially spaced from each other. As a result, the lip contact surface and the base contact surface are axially spaced from each other.

The axially spaced lip and the support base portion tend to ensure that a sealing effect is achieved even if the pipe threads and the protector threads are not screwed sufficiently far in each other and the pipe end has not yet reached its final make-up position but is already in contact with the lip. This sealing effect will be smaller than when the pipe end is located in its final make-up position, but it will provide some degree of protection for the pipe threads.

In an embodiment of the pipe end protector, the lip and the support base portion (more specifically the lip contact surface and the base contact surface) are axially spaced from each other in an axially non-compressed condition.

In an embodiment of the pipe end protector, the lip is configured to be in contact with the base contact surface via its lip contact surface when an axial force Fa is applied on the lip.

In an embodiment of the pipe end protector, the axial lip seal comprises an annular seal opening located between the lip contact surface and the base contact surface, and the seal opening provides access to an annular empty space which in a cross sectional view along the longitudinal axis is surrounded by the lip, the lip base portion, and the support base portion.

The empty space of the axial lip seal tends to forms a buffer zone which ensures that the axial pressure in the axial lip seal will build up less rapidly when the pipe threads and the protector threads are screwed too far in each other and the pipe end is located beyond its final make-up position. The buffer zone reduces the risk that the axial lip seal will be damaged. As a result, a better sealing is achieved and the pipe end protector can be re-used more often.

In an embodiment of the pipe end protector, the seal opening surrounds, in a cross section view along the longitudinal axis, less than 30%, preferably less than 20%, more preferably less than 10%, of the empty space.

In an embodiment of the pipe end protector, the seal opening is the only access to the empty space.

In an embodiment of the pipe end protector, the lip base portion protrudes away from the seal support surface to position the foot of the lip at a foot distance from the seal support surface in the axial direction.

In an embodiment of the pipe end protector, the support base portion protrudes away from the seal support surface to position the base contact surface at a support distance from the seal support surface in the axial direction.

In an embodiment of the pipe end protector, the axial lip seal comprises an annular intermediate base portion which extends radially along at least part of the seal support surface and is attached to the seal support surface by over moulding, and the intermediate base portion interconnects the lip base portion and the support base portion.

In an embodiment of the pipe end protector, the support base portion is located closer to the longitudinal axis than the lip base portion.

In an embodiment of the pipe end protector, the lip extending from the foot until the free rim is directing towards the longitudinal axis.

In an embodiment of the pipe end protector, the axial lip seal is a single piece made by over moulding.

In an embodiment of the pipe end protector, the base contact surface extends under a base angle $\alpha$ of between, and including, 80 and 90 degrees, preferably between, and including, 84 and 90 degrees, more preferably 87 degrees, relative to the longitudinal axis.

In an embodiment of the pipe end protector, the complete base contact surface extends under the same base angle $\alpha$.

In an embodiment of the pipe end protector, the lip contact surface extends under a lip angle $\beta$ of between, and including, 56 and 76 degrees preferably between, and including 61 and 71 degrees, more preferably 66 degrees, relative to the longitudinal axis.

In an embodiment of the pipe end protector, the complete lip contact surface extends under the same lip angle $\beta$.

In an embodiment of the pipe end protector, the base contact surface comprises a first base contact part and a second base contact part, the first base contact part extends under a first base angle $\alpha 1$ relative to the longitudinal axis, the second base contact part extends under a second base angle $\alpha 2$ relative to the longitudinal axis, and the first base angle is larger than the second base angle.

In an embodiment of the pipe end protector, the first base contact part is located at a first support distance from the seal support surface in the axial direction and the second base contact part is located at a second support distance from the seal support surface in the axial direction.

In an embodiment of the pipe end protector, the first support distance is smaller than the second support distance.

In an embodiment of the pipe end protector, the second base contact part is located closer to the longitudinal axis than the first base contact part.

In an embodiment of the pipe end protector, the first base angle $\alpha 1$ is between, and including, 80 and 100 degrees, preferably between, and including, 85 and 95 degrees, more preferably 90 degrees, relative to the longitudinal axis, and the second base angle $\alpha 2$ is between, and including, 0 and 20 degrees, preferably between, and including, 5 and 15 degrees, more preferably 10 degrees, relative to the longitudinal axis.

In an embodiment of the pipe end protector, the lip contact surface comprises a first lip contact part and a second lip contact part, the first lip contact part extends under a first lip angle $\beta 1$ relative to the longitudinal axis, the second lip contact part extends under a second lip angle $\beta 2$ relative to the longitudinal axis, and the first lip angle is larger than the second lip angle.

In an embodiment of the pipe end protector, the second lip contact part is located closer to the longitudinal axis than the first lip contact part.

In an embodiment of the pipe end protector, the first lip angle $\beta 1$ is between, and including, 58 and 78 degrees, preferably between, and including, 63 and 73 degrees, more preferably 68 degrees relative to the longitudinal axis, and the second lip angle $\beta 2$ is between, and including, 5 and 25 degrees, preferably between, and including, 10 and 20 degrees, more preferably 15 degrees, relative to the longitudinal axis.

In an embodiment of the pipe end protector, the axial lip seal is an internal lip seal and the pipe end protector comprises an air passage located closer to the longitudinal axis than the internal lip seal when seen in a radial direction. The air passage may be a through hole.

In an embodiment of the pipe end protector, the lip seal is a radial lip seal, and the free rim is located closer to the longitudinal axis than the lip base portion and directed towards the longitudinal axis. A better sealing capacity tends to be achieved by the form of the radial lip seal.

In an embodiment of the pipe end protector, the free rim is located closer to the longitudinal axis than the lip base portion and directed towards the longitudinal axis in a radially non-compressed condition.

In an embodiment of the pipe end protector, the free rim is directing towards the longitudinal axis under a rim angle $\gamma$ of between, and including, 80 and 100 degrees, preferably between, and including, 85 and 95 degrees, more preferably 90 degrees, relative to the longitudinal axis.

In an embodiment of the pipe end protector, the lip comprises an intermediate lip section located between the foot and the free rim and extending under an intermediate angle δ of between, and including, 8 and 28 degrees, preferably between, and including, 13 and 23 degrees, more preferably 18 degrees, relative to the longitudinal axis.

In an embodiment of the pipe end protector, the lip extends from the foot to multiple free rims which are located closer to the longitudinal axis than the lip base portion (in a radially non-compressed condition).

In an embodiment of the pipe end protector, the multiple free rims are spaced apart, preferably spaced evenly apart, and extend parallel to each other.

In an embodiment of the pipe end protector, the multiple free rims are directing towards the longitudinal axis under the same rim angle γ relative to the longitudinal axis.

In an embodiment of the pipe end protector, the radial lip seal is a single piece made by over moulding.

In an embodiment of the pipe end protector, the pipe end protector is configured to protect the pipe threads on a female pipe end, the main body comprises two support portions, respectively a first support portion having a first seal support surface and a second support portion having a second seal support surface, the pipe end protector comprises two axial lip seals, respectively a first axial lip seal provided on the first seal support surface and a second axial lip seal provided on the second seal support surface, the first axial lip seal is an internal lip seal, and the second axial lip seal is an external lip seal.

In an embodiment of the pipe end protector, the pipe end protector is configured to protect the pipe threads on a male pipe end, the main body comprises two support portions, respectively a first support portion having a first seal support surface and a second support portion having a second seal support surface, the pipe end protector comprises two lip seals, respectively an axial lip seal provided on the first seal support surface and a radial lip seal provided on the second seal support surface, the axial lip seal is an internal lip seal, the radial lip seal is an external lip seal.

In an embodiment of the pipe end protector, the pipe end protector comprises the features of any combination of any number of the above defined embodiments of the pipe end protector.

The invention also relates to an assembly comprising a pipe component for exploration and production of a hydrocarbon well, which pipe component has a pipe end provided with pipe threads, and a pipe end protector according to the invention, wherein the pipe threads and the protector threads are screwed in each other and the pipe end is located in its final make-up position in which the lip of the axial lip seal is pushed in contact with the support base portion by an axial force Fa applied by the pipe end. As a result of this, the lip contact surface of the lip is in contact with the base contact surface of the support base portion.

The invention also relates to an assembly comprising a pipe component for exploration and production of a hydrocarbon well, which pipe component has a pipe end provided with pipe threads, and a pipe end protector according to the invention, wherein the pipe threads and the protector threads are screwed in each other and the pipe end is located in its final make-up position in which the free rim of the radial lip seal is pushed radially outwards by a radial force Fr applied by the pipe end.

The invention also relates to a method of producing a pipe end protector for protecting pipe threads provided on a pipe end of a pipe component for exploration and production of a hydrocarbon well, said method comprising;

injecting a first polymeric material in a main mould configured to form a main body having a first elastic modulus, a longitudinal axis, at least one support portion having an at least party radially extending annular seal support surface, and a tubular portion, after removing the main body from the main mould, placing an lip seal mould over the seal support surface, and injecting a second polymeric material in the lip seal mould which is configured to form an annular flexible lip seal having a second elastic modulus being lower than the first elastic modulus and comprising an annular lip base portion which extends radially along at least part of the seal support surface and is attached to the seal support surface by over moulding.

In an embodiment of the method, the method comprises using a threading device to form protector threads on the tubular portion, which protector threads are configured to cooperate with the pipe threads of the pipe end.

In an embodiment of the method, the method comprises using the main mould to form protector threads on the tubular portion, which protector threads are configured to cooperate with the pipe threads of the pipe end.

In an embodiment of the method, the lip seal mould is configured to form a lip seal having the features of the lip seal of any of the above defined embodiments of the pipe end protector.

In an embodiment of the method, the lip seal mould is configured to form the lip seal having an annular lip which extends from a foot of the lip being attached to the lip base portion to a free rim of the lip being axially spaced from the lip base portion, wherein the foot and the free rim are radially offset.

In an embodiment of the method;
the lip seal mould is an axial lip seal mould configured to form the axial lip seal comprising;
an annular support base portion which extends radially along at least part of the seal support surface and is attached to the seal support surface by over moulding, and
an annular base contact surface located on the support base portion and configured to, in use, contact an lip contact surface located on the lip, wherein;
the lip base portion and the support base portion are radially spaced from each other,
the lip contact surface and the contact portion are axially spaced from each other,
the axial lip seal comprises an annular seal opening located between the lip contact surface and the base contact surface, and
the seal opening provides access to an annular empty space which in a cross section view along the longitudinal axis is surrounded by the lip, the lip base portion, and the support base portion,
the axial lip seal mould comprises an annular space mould portion configured to form the empty space of the axial lip seal, and
the method comprises removing the annular space mould portion via the seal opening of the axial lip seal after the second polymeric material has been injected in the axial lip seal mould.

In an embodiment of the method, the lip seal mould is a radial lip seal mould configured to form the radial lip seal wherein the free rim is located closer to the longitudinal axis than the lip base portion and directed towards the longitudinal axis.

In an embodiment of the method, the first polymeric material and the second polymeric material are selected to adhesively attach to each other by over moulding.

In an embodiment of the method, the adhesive attachment is caused by chemical, dispersive and/or diffusive adhesion of the first polymeric material and the second polymeric material created by over moulding.

In an embodiment of the method, the first polymeric material of the main body is a polyolefin, preferable polyethylene.

In an embodiment of the method, the second polymeric material of the axial lip seal is an elastomer, preferably an olefin block copolymer, more preferably a block copolymer of blocks of polyethylene alternating with blocks of ethylene/octene copolymer.

In an embodiment of the method, the method comprises the features of any combination of any number of the above defined embodiments of the method.

BRIEF DESCRIPTION OF THE INVENTION

Figure 1C:
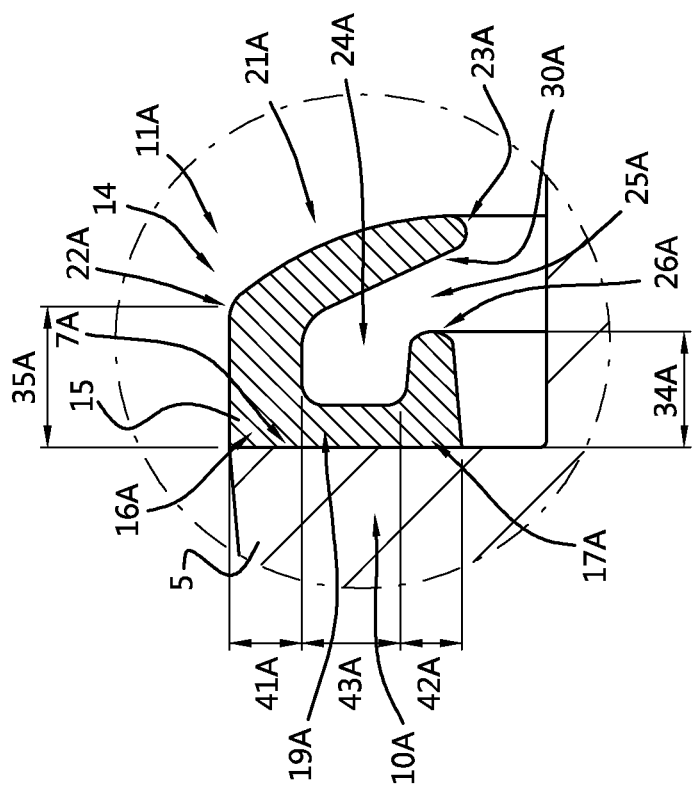
Figure 1D:
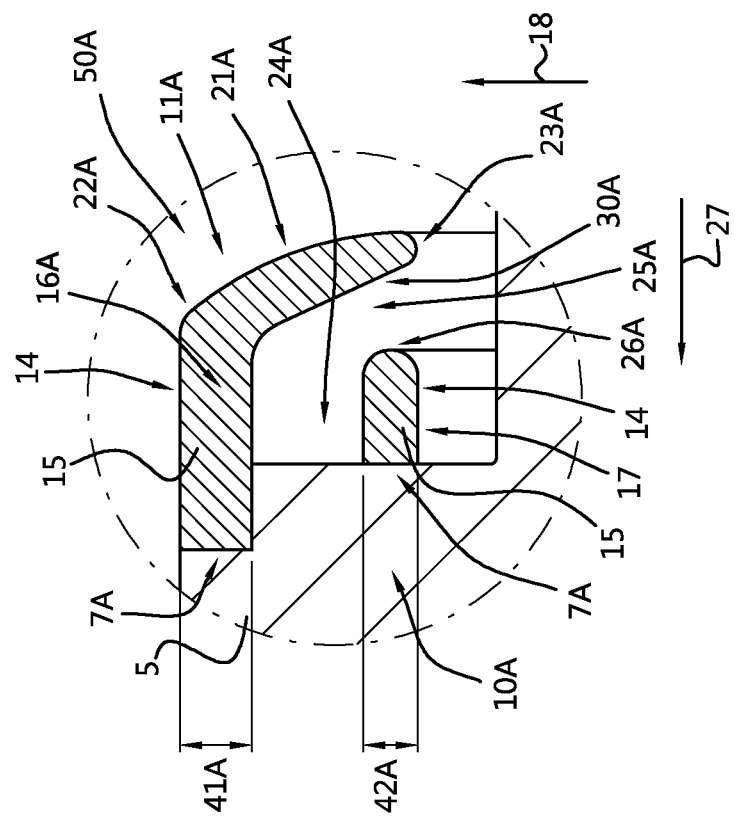
Figure 3C:
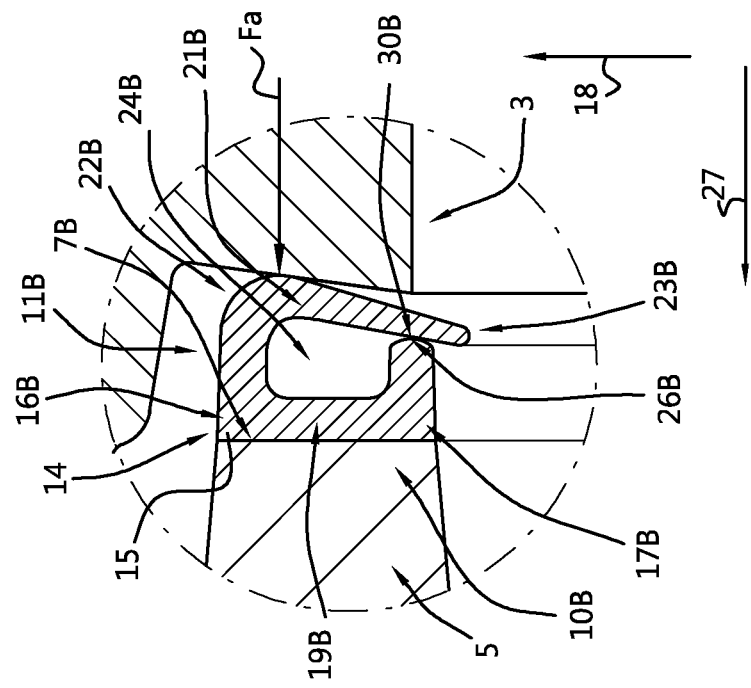
Figure 3B:
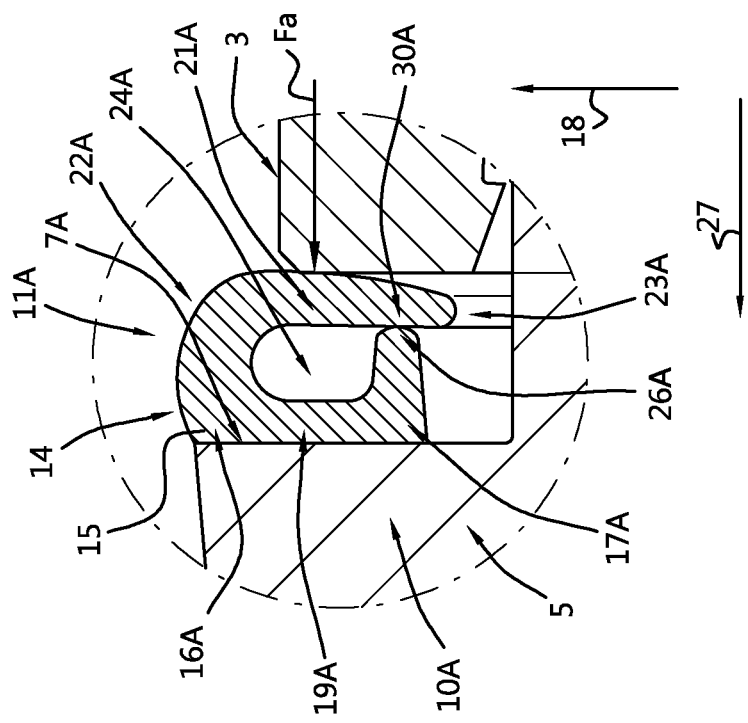
Figure 6C:
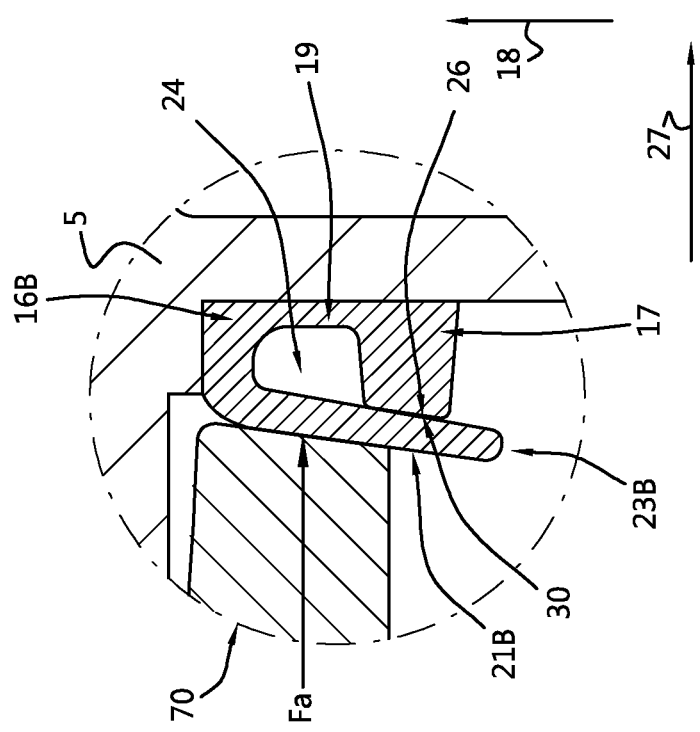
Figure 6B:
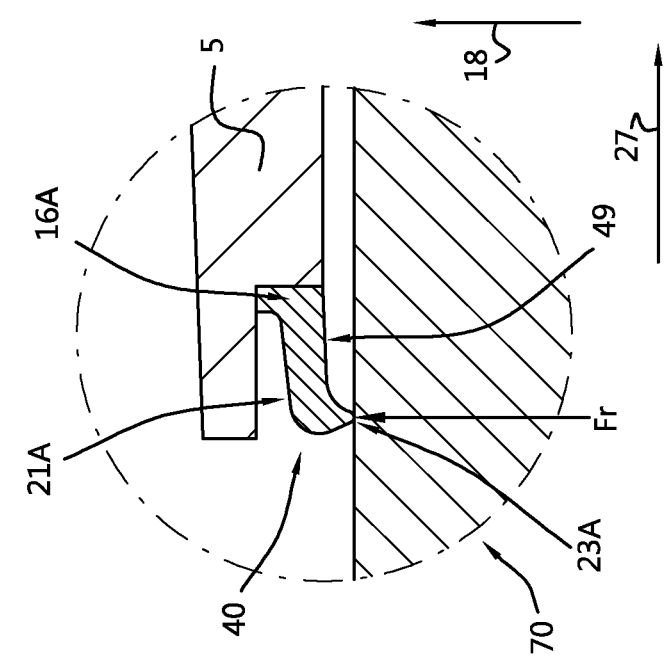
Figure 8A:
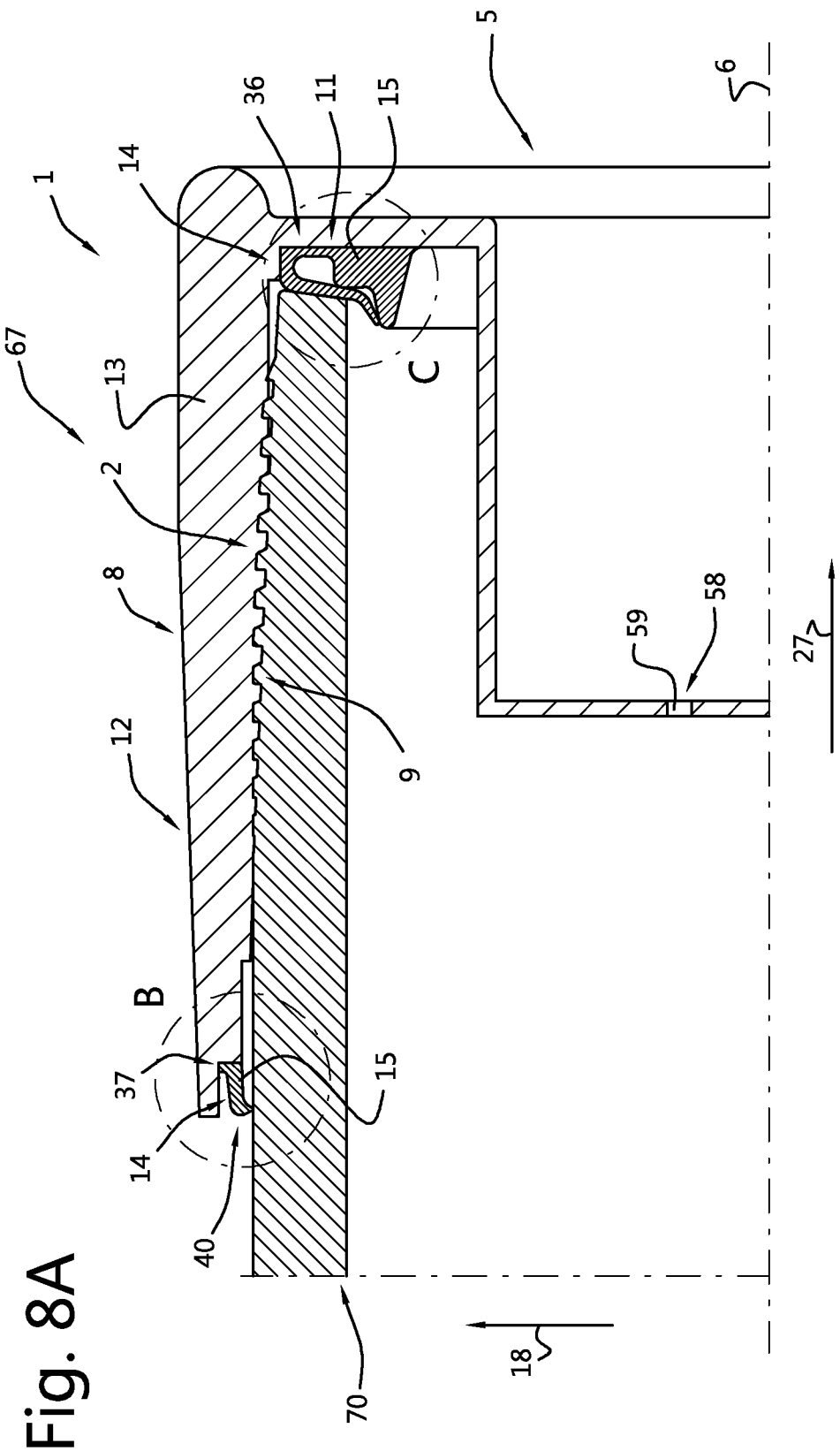
Figure 8C:
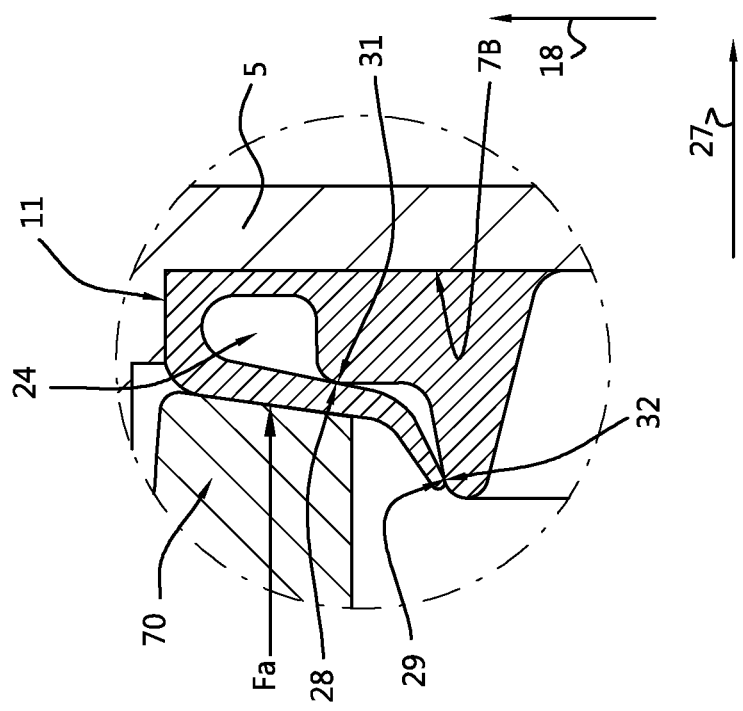
Figure 8B:
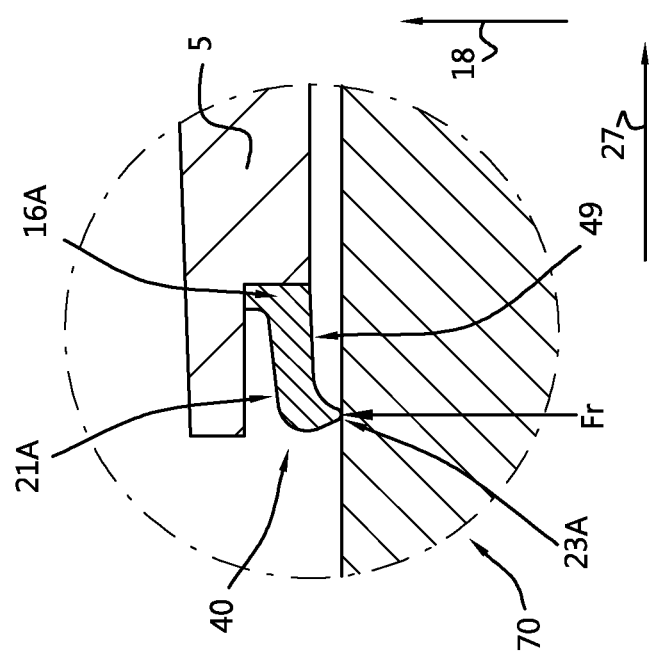

Embodiments of the pipe end protector, the assembly and the method according to the invention will be described by way of example only, with reference to the accompanying schematic drawings in which corresponding reference symbols indicate corresponding parts, and in which:

FIG. 1A schematically shows a cross sectional view of a first embodiment of the pipe end protector according to the invention, FIG. 1B schematically shows an enlarged view of part B of FIG. 1A, FIG. 1C schematically shows an enlarged view of part C of FIG. 1A, FIG. 1D schematically shows an enlarged view of an alternative embodiment of part B of FIG. 1A, FIG. 2 schematically shows a cross sectional view of a female pipe end of a pipe component for the pipe end protector of FIG. 1, FIG. 3A schematically shows a cross sectional view of a first embodiment of an assembly according to the invention, FIG. 3B schematically shows an enlarged view of part B of FIG. 3A, FIG. 3C schematically shows an enlarged view of part C of FIG. 3A, FIG. 4A schematically shows a cross sectional view of a second embodiment of the pipe end protector according to the invention, FIG. 4B (I and II) schematically shows an enlarged view of part B of FIG. 4A, FIG. 4C (I and II) schematically shows an enlarged view of part C of FIG. 4A, FIG. 4D (I and II) schematically shows an enlarged view of an alternative embodiment of part B of FIG. 4A, FIG. 5 schematically shows a cross sectional view of a male pipe end of a pipe component for the pipe end protector of FIG. 4, FIG. 6A schematically shows a cross sectional view of a second embodiment of an assembly according to the invention, FIG. 6B schematically shows an enlarged view of part B of FIG. 6A, FIG. 6C schematically shows an enlarged view of part C of FIG. 6A, FIG. 7A schematically shows a cross sectional view of a third embodiment of the pipe end protector according to the invention, FIG. 7B schematically shows an enlarged view of part B of FIG. 7A, FIG. 7C (I-III) schematically shows an enlarged view of part C of FIG. 7A, FIG. 8A schematically shows a cross sectional view of a third embodiment of an assembly according to the invention, FIG. 8B schematically shows an enlarged view of part B of FIG. 8A, FIG. 8C schematically shows an enlarged view of part C of FIG. 8A, and the FIGS. 9A-H schematically show an embodiment of the method according to the invention.

DETAILED DESCRIPTION OF THE INVENTION

FIG. 1A shows a cross sectional view of a first embodiment of the pipe end protector 1 according to the invention. The pipe end protector 1 is configured to be screwed on the female pipe end 35 of the pipe component 4 of FIG. 2. Only the upper half of the pipe end protector 1 is shown, but it will be clear to the skilled person that the pipe end protector 1 is radial symmetric. This also applies to the other figures in which only an upper half is shown. The FIGS. 1B and 10 show enlarged views of the part B and C of FIG. 1A, respectively.

The pipe end protector 1 is configured to the protect pipe threads 2 provided on a pipe end 3 of a pipe component 4 for exploration and production of a hydrocarbon well. The pipe end protector 1 comprises a main body 5 having a longitudinal axis 6, at least one support portion 10 having an at least partly radially extending annular seal support surface 7, and a tubular portion 8 provided with protector threads 9 configured to cooperate with the pipe threads 2 of the pipe end 3. An annular flexible lip seal 50 is provided on the seal support surface 7. The flexible lip seal 50 is an axial lip seal 11. As will be explained in detail, two lip seals 50 A,B, more specifically two axial lip seals 11A,B, are provided.

The main body 5 is made from a first polymeric material 12 having a first elastic modulus 13. The axial lip seal 11 is made from a second polymeric material 14 having a second elastic modulus 15 which is lower than the first elastic modulus 13.

The axial lip seal 11 comprises an annular lip base portion 16 which extends radially along at least part of the seal support surface 7 over a lip base thickness 41 and is attached to the seal support surface 7 by over moulding. The axial lip seal 11 comprises an annular lip 21 which extends from a foot 22 of the lip 21 being attached to the lip base portion 16 to a free rim 23 of the lip 21 being axially spaced from the lip base portion 16 in an axially non-compressed condition. The foot 22 and the free rim 23 are radially offset.

The axial lip seal 11 comprises an annular support base portion 17 which extends radially along at least part of the seal support surface 7 and is attached to the seal support surface 7 by over moulding. The support base portion 17 comprises an annular base contact surface 26 configured to, in use, contact an annular lip contact surface 30 of the lip 21. The lip base portion 16 and the support base portion 17 are radially spaced from each other. The lip 21 and the support base portion 17 are axially spaced from each other. As a result of this, the lip contact surface 30 and the base contact surface 26 are axially space from each other.

The axial lip seal 11 comprises an annular intermediate base portion 19 which extends radially along at least part of the seal support surface 7 and is attached to the seal support surface 7 by over moulding. The intermediate base portion 19 interconnects the lip base portion 16 and the support base portion 17. The axial lip seal 11 is a single piece made by injection over moulding.

The axial lip seal 11 comprises an annular seal opening 25 located between the lip contact surface 30 and the base contact surface 26. The seal opening 25 provides access to an annular empty space 24 which in a cross sectional view along the longitudinal axis 6 is surrounded by the lip 21, the lip base portion 16, and the support base portion 17.

Since the axial lip seal 11 is over moulded onto the seal support surface 7 of the main body 5, the pipe end protector 1 can be produced in a more efficient manner with less or no manual labour. This reduces the production costs of the pipe end protector 1. Over moulding is a production process in which an item is (injection) moulded over (part of) another item.

The pipe end protector 1 has an increased sealing capacity to protect the pipe threads 2.

The annular empty space 24 of the axial lip seal 11 forms a buffer zone which ensures that the axial pressure in the axial lip seal 11 will build up less rapidly when the pipe threads 2 and the protector threads 9 are screwed too far in each other and the pipe end 3 is located beyond its final make-up position 70. The buffer zone reduces the risk that the axial lip seal 11 will be damaged. As a result, a better sealing is achieved and the pipe end protector 1 can be re-used more often.

The fact that the free rim 23 of the lip 21 is axially spaced from the lip base portion 16 ensures that a sealing effect can be achieved even if the pipe threads 2 and the protector threads 9 are not screwed sufficiently far in each other and the pipe end 3 has not yet reached its final make-up position 70 but is in contact with the lip 21. This sealing effect will be smaller than when the pipe end 3 is located in its final make-up position 70, but it will provide some degree of protection for the pipe threads 2.

The axial lip seal 11 with its empty space 24 has a slender form which is very suitable for over moulding. This allow that the axial lip seal 11 can be over moulded in an efficient and reliable manner.

More specifically, the main body 5 of the pipe end protector 1 of FIG. 1 comprises a first support portion 10A having a first seal support surface 7A supporting a first axial lip seal 11A which forms an external lip seal 37, and a second support portion 10B having a second seal support surface 7B supporting a second axial lip seal 11B which forms an internal lip seal 37. Each axial lip seal 11A,B is made in one piece by injection over moulding.

The pipe end protector 1 comprises an air passage 58 located closer to the longitudinal axis 6 than the internal lip seal 36 when seen in a radial direction 18. The air passage 58 avoids that an over pressure is formed in the pipe component 4 when pipe end protectors 1 are placed at both pipe ends 3. The air passage 58 is a through hole 59.

The first polymeric material 12 of the main body 5 is a polyolefin, more specifically a polyethylene. The second polymeric material 14 of the axial lip seal 11A,B is an elastomer, more specifically an olefin block copolymer, even more specifically a block copolymer of blocks of polyethylene alternating with blocks of ethylene/octene copolymer.

The first polymeric material 12 and the second polymeric material 14 are selected to adhesively attach to each other by over moulding. Adhesive attachment between the axial lip seal 11A,B and the seal support surface 7 of the main body 5 is caused by chemical, dispersive and/or diffusive adhesion of the first polymeric material 12 and the second polymeric material 14 created by over moulding.

Chemical adhesion occurs when surface atoms of a material form ionic, covalent or hydrogen bonds with surface atoms of another material. In dispersive adhesion two materials are held together by van der Waals forces. Diffusive adhesion occurs with polymer chains where an end of a molecule of a polymeric material has diffused into another polymeric material. When both polymeric materials are crystalline, cocrystallization of polymer chains may occur. Preferably the adhesive attachment is caused by diffusive adhesion of polymer chains, optionally including cocrystallization.

The axial lip seal 11 A,B will remain at its position on the seal support surface 7 when the pipe end protector 1 is re-used, because the axial lip seal 11 A,B is attached to the seal support surface 7 by over moulding. As a result, the sealing capacity of the pipe end protector 1 will reduce less when it is re-used. The pipe end protector 1 can therefore be re-used more often.

The radial direction 18 and the axial direction 27 are indicated in the figures.

The lip base portion 16 protrudes away from the seal support surface 7 to position the foot 22 of the lip 21 at a foot distance 33 from the seal support surface 7 in the axial direction 18. The support base portion 17 protrudes away from the seal support surface 7 to position the base contact surface 26 at a support distance 34 from the seal support surface 7 in the axial direction 18.

The seal opening 25 surrounds, in a cross section view along the longitudinal axis 6, less than 30%, preferably less than 20%, more preferably less than 10%, of the empty space 24.

Figure 9G:
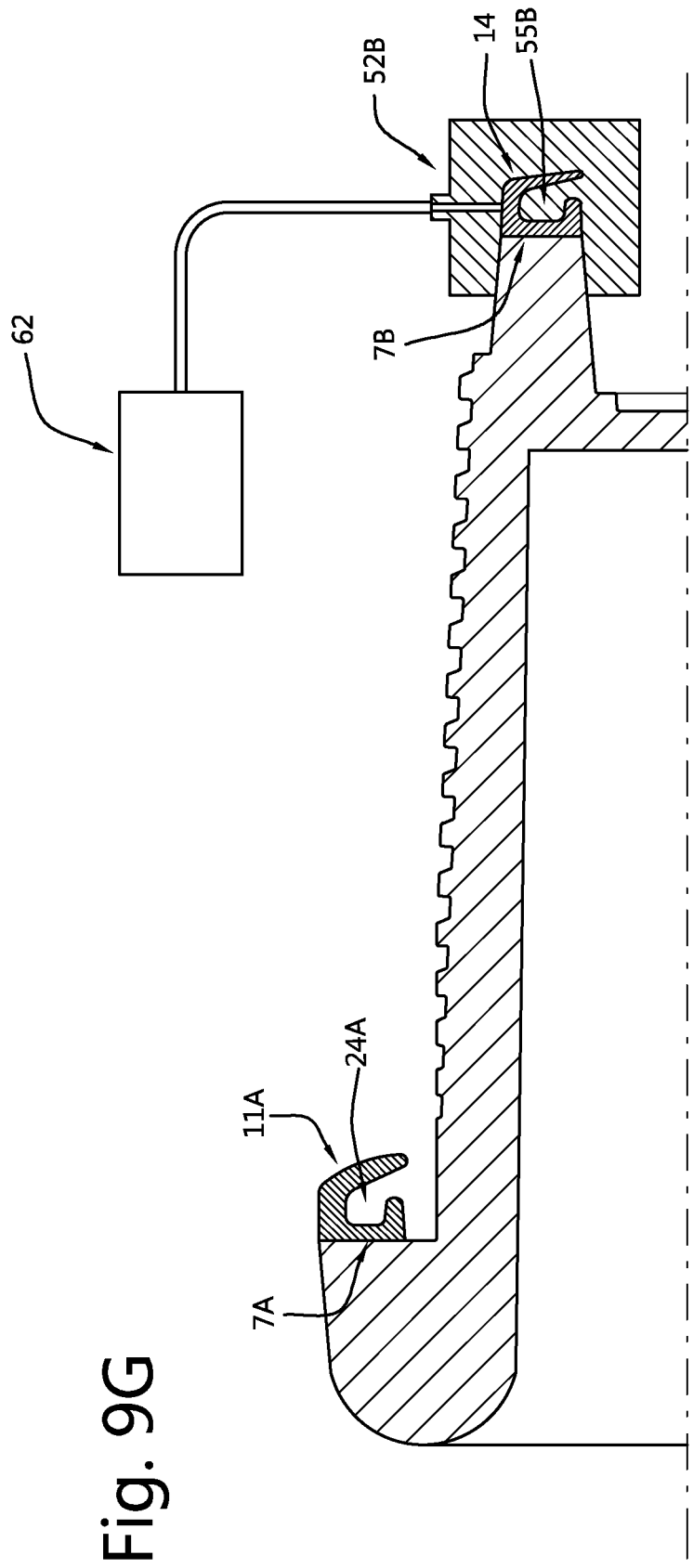

The seal opening 25 allows that the empty space 24 is formed by an annular space mould portion 55 of an axial seal mould 53 configured to form the axial lip seal 11 by over moulding (see FIGS. 9E and 9G).

The seal opening 25 is the only access to the empty space 24. The lip 21 extending from the foot 22 until the free rim 23 is directing towards the longitudinal axis 6. The support base portion 17 is located closer to the longitudinal axis 6 than the lip base portion 16.

FIG. 1D shows an enlarged view of an alternative embodiment of part B of FIG. 1A. The alternative axial lip seal 11 differs in that it does not comprise an intermediate base portion 19 due to which the lip base portion 16 and the support base portion 17 are not interconnected. The axial lip seal 11 is made in two, and only two, pieces by injection over moulding. The alternative main body 5 differs in that the seal support surface 7 does not only extend in the radial direction 18, but also in the axial direction 27.

The FIGS. 1A-C show the pipe end protector 1 in an axially non-compressed condition. The FIGS. 3A-C show the pipe end protector 1 in an axially compressed condition.

FIG. 3A shows a cross sectional view of a first embodiment of an assembly 67 comprising the pipe end protector 1 of FIG. 1 and the female pipe end 35 of the pipe component 4 of FIG. 2. The FIGS. 3B and 3C show enlarged views of the parts B and C of FIG. 3A, respectively.

The lip base portion 16 comprises a base contact surface 26 and the lip 21 is configured to come in contact with the base contact surface 26 when an axial force Fa is applied on the lip 21.

In the assembly 67 of FIG. 3A, the pipe threads 2 and the protector threads 9 are screwed in each other and the pipe end 3 is located in its final make-up position 70 in which the lip 21 of the axial lip seal 11 is pushed in contact with the support base portion 17 by an axial force Fa applied by the pipe end 3.

FIG. 4A shows a cross sectional view of a second embodiment of the pipe end protector 1 according to the invention. The pipe end protector 1 is configured to be screwed on the male pipe end 38 of the pipe component 4 of FIG. 5. The FIGS. 4B (I and II) and 4C (I and II) show enlarged views of the parts B and C of FIG. 4A. The features discussed in relation to the first embodiment of the pipe end protector 1 shown in FIG. 1 apply in the same manner.

The base contact surface 26 extends under a base angle α of about 87 degrees relative to the longitudinal axis 6. The complete base contact surface 26 extends under the same base angle α.

In other examples, the base contact surface 26 extends under a base angle α of the between, and including, 80 and 90 degrees, preferably between, and including, 84 and 90 degrees, relative to the longitudinal axis 6.

The lip contact surface 30 extends under a lip angle β of about 66 degrees relative to the longitudinal axis 6. The complete lip contact surface 30 extends under the same lip angle R.

In other examples the lip contact surface 30 extends under a lip angle β of between, and including, 56 and 76 degrees, preferably between, and including 61 and 71 degrees, relative to the longitudinal axis 6.

The embodiment of FIG. 4 differs from the embodiment of FIG. 1 in that it comprises only one axial lip seal 11. The axial lip seal 11 is an internal lip seal 36. The external lip seal 37 is a radial lip seal 40. The free rim 23A of the radial lip seal 40 is located closer to the longitudinal axis 6 than the lip base portion 16A. The free rim 23A is directed towards the longitudinal axis 6. A better sealing capacity is achieved by the form of the radial lip seal.

The main body 5 comprises a further support portion 50 having a annular radially extending further seal support surface 39. An annular flexible radial lip seal 40 is provided on the further seal support surface 39. The radial lip seal 40 is made from the second polymeric material 14. The radial lip seal 40 forms an external lip seal 37. The radial lip seal 40 comprises an annular further base portion 43 which extends radially along the further seal support surface 39 over a further base thickness 46 and is attached to the further seal support surface 39 by over moulding, and an annular further lip 44 which extends from a further foot 45 of the further lip 44 being attached to the further base portion 43 to a further free rim 47 which is located closer to the longitudinal axis 6 than the further base portion 43 in a radially non-compressed condition.

The free rim 23A is directed towards the longitudinal axis 6. The free rim 23A is directing towards the longitudinal axis 6 under a rim 48 angle γ of about 90 degrees relative to the longitudinal axis 6.

In other examples, the free rim 23A is directing towards the longitudinal axis 6 under a rim angle γ of between, and including, 80 and 100 degrees, preferably between, and including, 85 and 95 degrees, relative to the longitudinal axis 6

The lip 21A comprises an intermediate lip section 49 located between the foot 22A and the free rim 23A and extending under an intermediate angle δ of about 18 degrees relative to the longitudinal axis 6.

In other examples, the intermediate lip section 49 extends under an intermediate angle δ of between, and including, 8 and 28 degrees, preferably between, and including, 13 and 23 degrees, more preferably 18 degrees, relative to the longitudinal axis 6.

The radial lip seal 40 is a single piece made by injection over moulding.

An alternative embodiment of the radial lip seal 40 is shown in the FIGS. 4D-I and 4D-II. The annular lip 21A extends from the foot 22A to a first free rim 23A-I and a second free rim 23A-II. The first and second free rims 23A-I and II are located closer to the longitudinal axis 6 than the lip base portion 16A in a radially non-compressed condition. In yet another example, the lip 21A comprises between, and including, 3 and 6 free rims 23A.

The multiple free rims 23A are evenly spaced apart, extend parallel to each other, and are directing towards the longitudinal axis 6 under the same rim angle γ relative to the longitudinal axis 6.

The FIGS. 4A-C show the pipe end protector 1 in an axially non-compressed condition and in a radially non-compressed condition. The FIGS. 6A-C show the pipe end protector 1 in an axially compressed condition and in a radially compressed condition.

FIG. 6A shows a cross sectional view of a second embodiment of an assembly 67 comprising the pipe end protector 1 of FIG. 4 and the male pipe end 38 of the pipe component 4 of FIG. 5. The FIGS. 6B and 6C show enlarged views of the parts B and C of FIG. 6A, respectively.

In the assembly 67 of FIG. 6A, the pipe threads 2 and the protector threads 9 are screwed in each other and the pipe end 3 is located in its final make-up position 70 in which the lip 21B of the axial lip seal 11 is pushed against the support base portion 17 by an axial force Fa applied by the pipe end 3. The free rim 23A of the radial lip seal 40 is moved radially outwards by a radial force Fr applied by the pipe end 3.

FIG. 7A shows a cross sectional view of a third embodiment of the pipe end protector 1 according to the invention. The pipe end protector 1 is configured to be screwed on the male pipe end 38 of the pipe component 4 of FIG. 5. The FIGS. 7B and 7C (I-III) show enlarged view of the parts B and C of FIG. 7A.

The embodiment of FIG. 7 differs from the embodiment of FIG. 4 in that it comprises a different axial lip seal 11.

In the axial lip seal 11 of FIG. 7, the base contact surface 26 comprises a first base contact part 28 and a second base contact part 29. The first base contact part 28 extends under a first base angle α1 relative to the longitudinal axis 6. The second base contact part 29 extends under a second base angle α2 relative to the longitudinal axis 6. The first base angle is larger than the second base angle.

The first base contact part 28 is located at a first support distance 34-I from the seal support surface 7B in the axial direction 28 and the second base contact part 29 is located at a second support distance 34-II from the seal support surface 7B in the axial direction 27. The first support distance 34-I is smaller than the second support distance 34-II.

The second base contact part 29 is located closer to the longitudinal axis 6 than the first base contact part 28.

More specifically, the first base angle α1 is about 90 degrees relative to the longitudinal axis 6, and the second base angle α2 is about 10 degrees relative to the longitudinal axis 6.

In other examples, the first base angle α1 is between, and including, 80 and 100 degrees, preferably between, and including, 85 and 95 degrees relative to the longitudinal axis 6, and the second base angle α2 is between, and including, 0 and 20 degrees, preferably between, and including, 5 and 15 degrees, relative to the longitudinal axis 6.

The lip contact surface 30 comprises a first lip contact part 31 and a second lip contact part 32. The first lip contact part 31 extends under a first lip angle β1 relative to the longitudinal axis 6. The second lip contact part 32 extends under a second lip angle β2 relative to the longitudinal axis 6. The first lip angle is larger than the second lip angle. The second lip contact part 32 is located closer to the longitudinal axis 6 than the first lip contact part 31.

More specifically, the first lip angle β1 is about 68 degrees relative to the longitudinal axis 6, and the second lip angle β2 is about 15 degrees relative to the longitudinal axis 6.

In other examples, the first lip angle β1 is between, and including, 58 and 78 degrees, preferably between, and including, 63 and 73 degrees relative to the longitudinal axis 6, and the second lip angle β2 is between, and including, 5 and 25 degrees, preferably between, and including, 10 and 20 degrees, relative to the longitudinal axis 6.

The FIGS. 7A-C show the pipe end protector 1 in an axially non-compressed condition and in a radially non-compressed condition. The FIGS. 8A-C show the pipe end protector 1 in an axially compressed condition and in a radially compressed condition.

FIG. 8A shows a cross sectional view of a third embodiment of an assembly 67 comprising the pipe end protector 1 of FIG. 7 and the male pipe end 38 of the pipe component 4 of FIG. 5. The FIGS. 8B and 8C show enlarged views of the parts B and C of FIG. 6A, respectively.

The FIGS. 9A-H show an embodiment of the method according to the invention. More specifically, it shows an embodiment of the method of producing the pipe end protector 1 of FIG. 1. It will be clear to the skilled person that this method can be applied in a similar manner to produce the pipe end protectors 1 of the FIGS. 4 and 7 or other embodiments of the pipe end protector 1 according to the invention.

The method of producing the pipe end protector 1 of FIG. 1 comprises the following steps.

In FIG. 9A, a main mould 52 is provided. The main mould 52 is configured to form the main body 5. A first polymeric material supply 61 is connected to the main mould 52.

In FIG. 9B, the first polymeric material 12 is injected in the main mould 52 by the first polymeric material supply 61 to form the main body 5 having its first elastic modulus 13.

In FIG. 9C, the main body 5 is removed from the main mould 52.

In the shown embodiment of the method, the main mould 52 is used to form the protector threads 9 on the tubular portion 8. The protector threads 9 are formed on the tubular portion 8 during the injection of the first polymeric material 61 in the main mould 52.

In another embodiment of the method, a threading device (not shown) is used to form the protector threads 9 on the tubular portion 8. In this embodiment, the main mould 52 does not comprise the thread mould parts 57 to form the protector threads 9. The protector threads 9 are threaded on the tubular portion 8 after the main body 5 has been removed from the main mould 52.

In FIG. 9D, a first axial seal mould 53A is placed over the first seal support surface 7A. A second polymeric material supply 62 is connected to the first axial seal mould 53A. The first axial seal mould 53A comprises a first annular space mould portion 55A which will form the empty space 24 of the first axial lip seal 11A.

In FIG. 9E, the second polymeric material 14 is injected in the first axial seal mould 53A to form the first axial lip seal 11A having its second elastic modulus 15 being lower than the first elastic modulus 13. Due to the first empty space 24A, the first axial lip seal 11A only has relatively thin parts. The injection moulded second polymeric material 14 is therefore able to cool down relatively fast. This allows that the first axial lip seal 11A can be over moulded in a time efficient manner.

In FIG. 9F, the first axial seal mould 53A has been removed. The first annular space mould portion 55A has been removed via the first seal opening 25A. The production process of forming the first axial lip seal 11A on the first seal support surface 7A by over moulding has been completed. A second axial seal mould 53B is placed over the second seal support surface 7B. The second polymeric material supply 62 is connected to the second axial seal mould 53B.

In FIG. 9G, the second polymeric material 14 is injected in the second axial seal mould 53B to form the second axial lip seal 11B having its second elastic modulus 15 being lower than the first elastic modulus 13.

Figure 9H:
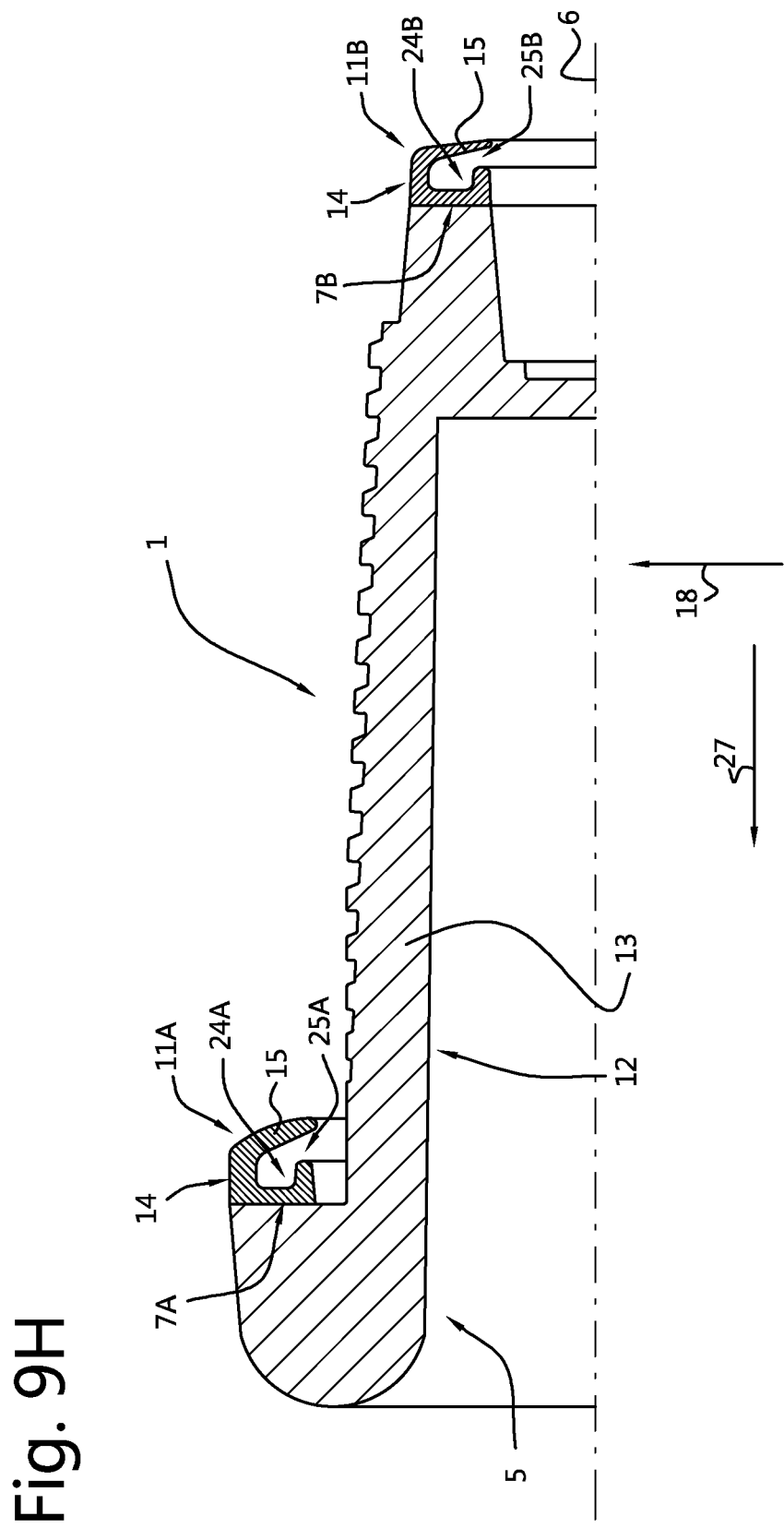

In FIG. 9H, the second axial seal mould 53B has been removed and the production process of forming the second axial lip seal 11B on the second seal support surface 7B by over moulding has been completed. More specifically, the production process of the complete pipe end protector 1 has been completed.

In an example to produce a pipe end protector 1 like the embodiments of the FIG. 4 or 7, a radial lip seal mould is used to over mould the radial lip seal 40 on the seal support surface 7A of the main body 5. The radial seal mould is configured to form the radial lip seal 40 wherein the free rim 23A is located closer to the longitudinal axis 6 than the lip base portion 16 and directed towards the longitudinal axis 6.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the pipe end protector, assembly and the method according to the invention without departing from the scope as defined in the claims.

The first polymeric material and/or the second polymeric material may comprise additives such as colorants, fillers, flame retardants, pigments, reinforcing fibres, plasticisers, and other additives known to a person skilled in the art.

The invention claimed is:

1. A pipe end protector for protecting pipe threads provided on a pipe end of a pipe component for exploration and production of a hydrocarbon well, said pipe end protector comprising:
   a main body having a longitudinal axis, at least one support portion having an at least partly radially extending annular seal support surface, and a tubular portion provided with protector threads configured to cooperate with the pipe threads of the pipe end, and an annular flexible lip seal provided on the seal support surface, wherein
  the main body is made from a first polymeric material having a first elastic modulus,
  the lip seal is made from a second polymeric material having a second elastic modulus which is lower than the first elastic modulus, and
  the lip seal comprises an annular lip base portion which extends radially along at least a portion of the seal support surface and is attached to the seal support surface by over moulding;
  the lip seal is an axial lip seal,
  the axial lip seal comprises an annular support base portion which extends radially along at least a portion of the seal support surface and is attached to the seal support surface by over moulding;
the annular support base portion comprises an annular base contact surface configured to, in use, contact an annular lip contact surface of the lip seal,
the lip base portion and the support base portion are radially spaced from each other, and
the lip seal and the support base portion are axially spaced from each other.

2. The pipe end protector according to claim 1, wherein the first polymeric material and the second polymeric material are selected to adhesively attach to each other by over moulding.

3. The pipe end protector according to claim 1, wherein the first polymeric material of the main body is a polyolefin and the second polymeric material of the lip seal is an elastomer.

4. The pipe end protector according to claim 1, wherein the lip seal comprises an annular lip which extends from a foot of the annular lip being attached to the lip base portion to a free rim of the lip being axially spaced from the lip base portion, and wherein the foot and the free rim are radially offset.

5. The pipe end protector according claim 1, wherein the axial lip seal further comprises an annular seal opening located between the lip contact surface and the base contact surface, and the annular seal opening provides access to an annular empty space which in a cross sectional view along the longitudinal axis is surrounded by the lip, the lip base portion, and the support base portion.

6. The pipe end protector according to claim 1, wherein
  the base contact surface extends under a base angle α of between, and including, 80 and 90 degrees relative to the longitudinal axis, and
  the lip contact surface extends under a lip angle β of between, and including, 56 and 76 degrees relative to the longitudinal axis.

7. The pipe end protector according to claim 1, wherein
the base contact surface comprises a first base contact part and a second base contact part,
the first base contact part extends under a first base angle α1 relative to the longitudinal axis,
the second base contact part extends under a second base angle α2 relative to the longitudinal axis,
the first base angle is larger than the second base angle,
the lip contact surface comprises a first lip contact part and a second lip contact part,
the first lip contact part extends under a first lip angle β1 relative to the longitudinal axis,
the second lip contact part extends under a second lip angle β2 relative to the longitudinal axis, and
the first lip angle is larger than the second lip angle.

8. The pipe end protector according to claim 1, wherein the axial lip seal is an internal lip seal and the pipe end protector further comprises an air passage located closer to the longitudinal axis than the internal lip seal when seen in a radial direction.

9. The pipe end protector according to claim 1, wherein
  the lip seal is a radial lip seal, and
  a free rim is located closer to the longitudinal axis than the lip base portion and directed towards the longitudinal axis.

10. The pipe end protector according to claim 9, wherein
  the free rim is directing towards the longitudinal axis under a rim angle γ of between, and including, 80 and 100 degrees relative to the longitudinal axis, and
  the lip seal further comprises an intermediate lip section located between a foot and the free rim and extending under an intermediate angle δ of between, and including, 8 and 28 degrees relative to the longitudinal axis.

11. The pipe end protector according to claim 1, wherein
  the pipe end protector is configured to protect the pipe threads on a female pipe end,
  the main body comprises two support portions, respectively a first support portion having a first seal support surface and a second support portion having a second seal support surface,
  the pipe end protector comprises two axial lip seals, respectively a first axial lip seal provided on the first seal support surface and a second axial lip seal provided on the second seal support surface,
  the first axial lip seal is an internal lip seal, and
  the second axial lip seal is an external lip seal.

12. The pipe end protector according to claim 1, wherein
  the pipe end protector is configured to protect the pipe threads on a male pipe end,
  the main body comprises two support portions, respectively a first support portion having a first seal support surface and a second support portion having a second seal support surface,
  the pipe end protector comprises two lip seals, respectively an axial lip seal provided on the first seal support surface and a radial lip seal provided on the second seal support surface,
  the axial lip seal is an internal lip seal, and
  the radial lip seal is an external lip seal.

13. An assembly comprising:
  a pipe component for exploration and production of a hydrocarbon well, which pipe component has a pipe end provided with pipe threads; and
  a pipe end protector comprising:
    a main body having a longitudinal axis, at least one support portion having an at least partly radially extending annular seal support surface, and a tubular portion provided with protector threads configured to cooperate with the pipe threads of the pipe end, and
    an annular flexible lip seal provided on the seal support surface, wherein
    the main body is made from a first polymeric material having a first elastic modulus,
    the lip seal is made from a second polymeric material having a second elastic modulus which is lower than the first elastic modulus, and
    the lip seal comprises an annular lip base portion which extends radially along at least a portion of the seal support surface and is attached to the seal support surface by over moulding; wherein
    the lip seal is an axial lip seal, the axial lip seal comprises an annular support base portion which extends radially along at least part of the seal support surface and is attached to the seal support surface by over moulding,
the annular support base portion comprises an annular base contact surface configured to, in use, contact an annular lip contact surface of the lip seal,
the lip base portion and the support base portion are radially spaced from each other, and
the lip seal and the support base portion are axially spaced from each other; and
wherein the pipe threads and the protector threads are screwed in each other and the pipe end is located in its final make-up position in which the lip of the axial lip seal is pushed in contact with the support base portion by an axial force Fa applied by the pipe end.

14. An assembly comprising:
a pipe component for exploration and production of a hydrocarbon well, which pipe component has a pipe end provided with pipe threads; and
a pipe end protector comprising:
a main body having a longitudinal axis, at least one support portion having an at least partly radially extending annular seal support surface, and a tubular portion provided with protector threads configured to cooperate with the pipe threads of the pipe end, and
an annular flexible lip seal provided on the seal support surface, wherein
the main body is made from a first polymeric material having a first elastic modulus,
the lip seal is made from a second polymeric material having a second elastic modulus which is lower than the first elastic modulus, and
the lip seal comprises an annular lip base portion which extends radially along at least a portion of the seal support surface and is attached to the seal support surface by over moulding; wherein
the lip seal is an axial lip seal, and
a free rim is located closer to the longitudinal axis than the lip base portion and directed towards the longitudinal axis; and
wherein the pipe threads and the protector threads are screwed in each other and the pipe end is located in its final make-up position in which the free rim of the radial lip seal is pushed radially outwards by a radial force Fr applied by the pipe end.

15. An assembly comprising:
a pipe component for exploration and production of a hydrocarbon well, which pipe component including a pipe end provided with pipe threads; and
a pipe end protector comprising:
a main body having a longitudinal axis, at least one support portion having an at least partly radially extending annular seal support surface, and a tubular portion provided with protector threads configured to cooperate with the pipe threads of the pipe end, and
an annular flexible lip seal provided on the seal support surface, wherein
the main body is made from a first polymeric material having a first elastic modulus,
the lip seal is made from a second polymeric material having a second elastic modulus which is lower than the first elastic modulus, and
the lip seal comprises an annular lip base portion which extends radially along at least a portion of the seal support surface and is attached to the seal support surface by over moulding; wherein
the lip seal is a radial lip seal, and
a free rim is located closer to the longitudinal axis than the lip base portion and directed towards the longitudinal axis;
wherein the free rim is directing towards the longitudinal axis under a rim angle $\gamma$ of between, and including 80 and 100 degrees relative to the longitudinal axis, and
the lip seal comprises an intermediate lip section located between a foot and the free rim and extending under an intermediate angle $\delta$ of between, and including, 8 and 28 degrees relative to the longitudinal axis; and
wherein the pipe threads and the protector threads are screwed in each other and the pipe end is located in its final make-up position in which the free rim of the radial lip seal is pushed radially outwards by a radial force Fr applied by the pipe end.

* * * * *